(12) United States Patent
Stanchfield et al.

(10) Patent No.: US 6,436,350 B1
(45) Date of Patent: Aug. 20, 2002

(54) MULTI-WELL ARRAY WITH ADJUSTABLE PLENUM

(75) Inventors: James E. Stanchfield, Sunnyvale; David J. Wright, Fremont; Chris N. Bailey, San Jose; Paul B. Robbins, Palo Alto, all of CA (US)

(73) Assignee: Robbins Scientific Corporation, Sunnyvale, CA (US)

( * ) Notice: Subject to any disclaimer, the term of this patent is extended or adjusted under 35 U.S.C. 154(b) by 0 days.

(21) Appl. No.: 09/499,068

(22) Filed: Feb. 4, 2000

Related U.S. Application Data

(60) Provisional application No. 60/118,801, filed on Feb. 5, 1999.

(51) Int. Cl.[7] .................................................. B01L 1/00
(52) U.S. Cl. ....................... 422/100; 422/102; 422/104; 422/131; 435/305.2; 435/305.3
(58) Field of Search .................... 422/99–104, 130–134, 422/196; 435/288.4, 305.2, 305.3; 277/345, 590

(56) References Cited

U.S. PATENT DOCUMENTS

| | | | |
|---|---|---|---|
| 4,912,057 A | 3/1990 | Guirguis et al. | 435/285 |
| 4,948,564 A | 8/1990 | Root et al. | 422/101 |
| 5,324,483 A | 6/1994 | Cody et al. | 422/131 |
| 5,609,826 A | 3/1997 | Cargill et al. | 422/99 |
| 5,702,672 A | * 12/1997 | DeWitt et al. | 422/131 |
| 5,714,127 A | * 2/1998 | DeWitt et al. | 422/131 |
| 5,716,584 A | * 2/1998 | Baker et al. | 422/131 |
| 5,753,187 A | 5/1998 | Reynolds et al. | 422/102 |
| 5,866,342 A | 2/1999 | Antonenko et al. | 435/7.1 |
| 6,054,100 A | * 4/2000 | Stanchfield et al. | 422/102 |
| 6,106,783 A | 8/2000 | Gamble | 422/102 |
| 6,149,869 A | * 11/2000 | Antonenko et al. | 422/99 |
| 6,274,091 B1 | * 8/2001 | Mohan et al. | 422/131 |
| 6,274,094 B1 | * 8/2001 | Weller et al. | 422/131 |
| 6,309,608 B1 | * 10/2001 | Zhou et al. | 422/131 |

OTHER PUBLICATIONS

Harold V. Meyers, Garrett J. Dilley, Tracy L. Durgin, Timothy S. Powers, Nicolas A. Winssinger, Hong Zhu and Michael R. Pavia; Multiple Simultaneous Synthesis of Phenolic Libraries; Molecular Diversity, vol. 1, pp. 13–20, Apr. 27, 1995.

* cited by examiner

*Primary Examiner*—Joseph W. Drodge
(74) *Attorney, Agent, or Firm*—Larry B. Guernsey; Intellectual Property Law Offices

(57) ABSTRACT

An apparatus for multiple simultaneous synthesis (110), having a number of vials (28), each vial (28) having an upper end (31), a lower end (30), and a barrel (29), the upper end (31) opening into a mouth (32). It also includes a lower frame assembly (180) having a number of holes (101, 103, 105) for receiving the vials (28), and an upper frame assembly (180), which includes inner side-walls (195) and a ceiling portion (190). A gas-tight seal (197) surrounds a plenum (85), the plenum (85) being formed between the ceiling portion (190) of the upper frame assembly (180) and the lower frame assembly (181). The plenum (85) is adjustable in volume by the positioning of the upper frame assembly (180) in variable relation to the lower frame assembly (181), while maintaining the gas-tight seal (197). The volume of the plenum (85) is adjustable to a minimum whereby the mouths (32) of the vials (28) are sealed by the ceiling (190) of the gas-tight seal (197), which is optionally an upper gasket (90). Also disclosed is a plenum enclosure (182) for multiple simultaneous synthesis used in conjunction with vials (28), which includes the upper frame assembly (180) and lower frame assembly (181) and the gastight seal (197), as well as a gasket vial holder (185) to be used in the plenum enclosure (182).

37 Claims, 16 Drawing Sheets

MULTI-WELL ARRAY WITH ADJUSTABLE PLENUM

This application claims priority from U.S. Provisional application Ser. No. 60/118,801, filed Feb. 5, 1999, which has the same inventors as the present application. This application is related to application Ser. No. 08/972,996 filed Nov. 18, 1997 by the same inventors now U.S. Pat. No. 6,054,100, titled "Apparatus for Multi-well Microscale Synthesis". Both applications are hereby incorporated by reference.

TECHNICAL FIELD

The present invention relates generally to apparatus for synthesizing and processing chemical and biological compounds, and to multi-well apparatus used in performing multiwell simultaneous synthesis.

BACKGROUND ART

The testing and analysis of chemical compounds on a micro scale has many advantages. Among these are the reduced costs of reagents, solvents and materials due to the reduced amounts needed, and the generation of less waste materials, which may be environmentally damaging and costly to dispose of. The reduction in volume of material necessary also allows for easier use of multiple reaction vessels within a single apparatus, so that devices having arrays of multiple wells are being used more and more. Standardization has begun in this field, so that a format of 96 wells in an 8×12 rectangular array is used in a large variety of applications, some of which involve automated handling of materials.

It has been the case for a number of years in the peptide field that use has been made of mechanized, computer-aided equipment capable of simultaneously synthesizing a number of different peptides by the sequential coupling of amino acids to functionalized solid supports. Such mechanized equipment may be employed because the conditions necessary for most such coupling reactions are uniformly simple and straightforward.

In the case of the synthesis of organic compounds generally, however, there is a great variance in the conditions and techniques which must be employed, which precludes or makes impractical the use of fully automated instruments. For example, magnetic stirring, shaking, or some other form of agitation may be needed, and heating or cooling to great temperature extremes may be required. With respect to reactions requiring heating, provision for the reflux of volatile solvent may also be necessary.

In addition, many chemical reactions are air sensitive and so may require an inert atmosphere, or a vacuum, for their performance. Reagents and substrates may be air sensitive (e.g., hygroscopic or pyrophoric) or corrosive. For such materials, it would extremely advantageous to use equipment in which the atmospheric conditions, or vacuum, may be easily provided without having to transfer materials into a vacuum chamber or glove box in order to allow manipulations.

The problem of manipulating material under such atmospheric conditions is compounded when the necessary manipulations include agitation of the materials, and/or heating of the contents. For some processes, vigorous agitation may be required which would be difficult to achieve in an open atmosphere without spillage, much less in an enclosure having a specialized atmosphere. For this reason, it would be desirable to seal the mouths of the individual wells while maintaining the required atmosphere.

One approach to the problem of maintaining a specialized atmosphere without having to use a bulky external vacuum chamber is to use a device having a gas-tight manifold which surrounds the device and may have ports for introduction of a controlled atmosphere. One prior art attempt is found in U.S. Pat. No. 5,324,483 issued Jun. 28, 1994 to Cody et al. In Cody, which is directed toward solid phase synthesis, the lower ends of a plurality of reaction tubes (in the nature of conventional gas dispersion tubes) are each received by a plurality of reaction wells. The reaction tubes are held vertically in place by a holder block, while the reactions wells are contained by a reservoir block. A seal is provided between the holder block and the reservoir block. A manifold covers the reaction tubes, with a seal being provided between the manifold and the holder block. Means are provided for detachably fastening together the reservoir block to the holder block and the holder block to the manifold. The dispersion tubes provide a glass frit type of filtering capability.

The invention in Cody has several draw-backs. The apparatus is bulky, and there is no way to seal the reaction tubes when vigorous agitation is required. For certain laboratory applications, mixing may be best accomplished by inverting the wells, so that the contents do not settle in layers. The apparatus in Cody has no sealing mechanism for the reaction tubes and thus obviously cannot be inverted without disastrous results. The volume of enclosed space within the manifold is not variable, and includes much more volume that is really necessary to charge the mouths of the reaction tubes with gas. Thus a greater than necessary volume of gas must be introduced and then purged, and in the case of toxic gases, disposed of safely. Some such gases may be expensive, and a savings in such usage may have a considerable impact on processing costs.

The size of the manifold volume may also have an impact on the creation of a vacuum for certain processing steps. The larger the volume to be evacuated, the larger the pump will have to be, to achieve the same vacuum in the same amount of time. Thus there may be cost savings in using a smaller volume.

Thus there is a need for an apparatus which can be used for multiple simultaneous synthesis on a micro scale, which allows for creation of an enclosed plenum which is adjustable in volume, and which can be easily configured to seal the mouths of all the wells simultaneously, thereby allowing the entire device to be inverted for agitation and mixing processes.

DISCLOSURE OF INVENTION

Accordingly, it is an object of the present invention to provide an apparatus for multiple simultaneous chemical and biological synthesis, chromatography, separation, extraction, analysis and processing on a micro scale which is simple to use.

It is another object of the invention to provide such an apparatus which is suitable for general organic synthesis, including provision for heating, agitation, addition by syringe, and the like.

It is a further object to provide such an apparatus which has a standard microplate footprint dimension and which is compatible with standard liquid handling and other batch processing equipment.

It is another object to provide such an apparatus which has a plenum of adjustable volume in which special atmospheric conditions or partial vacuums can be created.

It is a further object to provide such an apparatus in which the plenum volume can be adjusted to a minimum, so that the mouths of the wells can be simultaneously sealed.

It is yet a further object to provide such an apparatus which can be vigorously agitated without spillage of the contents of the apparatus.

It is yet another object to provide such an apparatus which can be completely inverted to allow for more complete mixing of materials without spillage.

It is an additional object of the invention that a plenum is provided which may be optionally adjustable between an open position and a closed position.

It is still another object of the present invention to provide an apparatus with a plenum which is continuously variable with respect to volume so that any volume within a defined range of volumes can be achieved, allowing flexibility of usage.

Briefly, the preferred embodiment of the present invention is an apparatus for multiple simultaneous synthesis, having a number of vials, each vial having an upper, a lower end, and a barrel, the upper end opening into a mouth portion. It also includes a lower frame assembly having a number of holes for receiving the vials, and an upper frame assembly, which includes inner side-walls and a ceiling portion. A gas-tight seal surrounds a plenum, the plenum being formed between the upper frame assembly ceiling portion, and the lower frame assembly. The plenum is adjustable in volume by the positioning of the upper frame assembly in variable relation to the lower frame assembly, while maintaining the gas-tight seal. The volume of the plenum is adjustable to a minimum whereby the mouths of the vials are sealed by the ceiling of the gas-tight seal, which is optionally an upper gasket.

Also disclosed is a plenum enclosure for multiple simultaneous synthesis used in conjunction with vials, which includes the upper and lower frame assembly and the a gas-tight seal, described in relation to the apparatus above. This plenum enclosure can be varied in design to accommodate vials of many different sizes, styles and manufactures.

An advantage of the present invention is that it allows a variety of gases to be introduced into the wells of the apparatus without having to relocate the apparatus to a specialized vacuum chamber or gas fill station.

Another advantage of the invention is that a vial holder gasket is provided which secures the included glass vials against movement.

A further advantage is that the same vial holder gasket is used to provide a gas-tight seal at the periphery of the plenum.

Yet another advantage is that the volume of the plenum is continually adjustable from a maximum volume down to a position where the mouths of all the reaction wells are simultaneously sealed.

Yet a further advantage is that the sealed reactions wells may then be vigorously agitated, and completely inverted without spillage of the contents.

Still another advantage is that the apparatus is designed to be attached into a rotating element and the entire apparatus is designed to be heated without damage to the apparatus.

Yet another advantage of the present invention is that after the reaction wells are sealed, the interiors of the wells may still be accessed through apertures aligned with the mouths of the reaction wells which are sealed with a gas-tight gasket which can be easily penetrated by a syringe needle, while still maintaining the gas-tight seal.

An additional advantage is that the present invention can work either with arrays of vials which are integrally fashioned into a unitary block, or with vials which are individually removable.

These and other objects and advantages of the present invention will become clear to those skilled in the art in view of the description of the best presently known mode of carrying out the invention and the industrial applicability of the preferred embodiment as described herein and as illustrated in the several figures of the drawings.

BRIEF DESCRIPTION OF THE DRAWINGS

The purposes and advantages of the present invention will be apparent from the following detailed description in conjunction with the appended drawings in which.

BEST MODE FOR CARRYING OUT THE INVENTION

Figure 1:
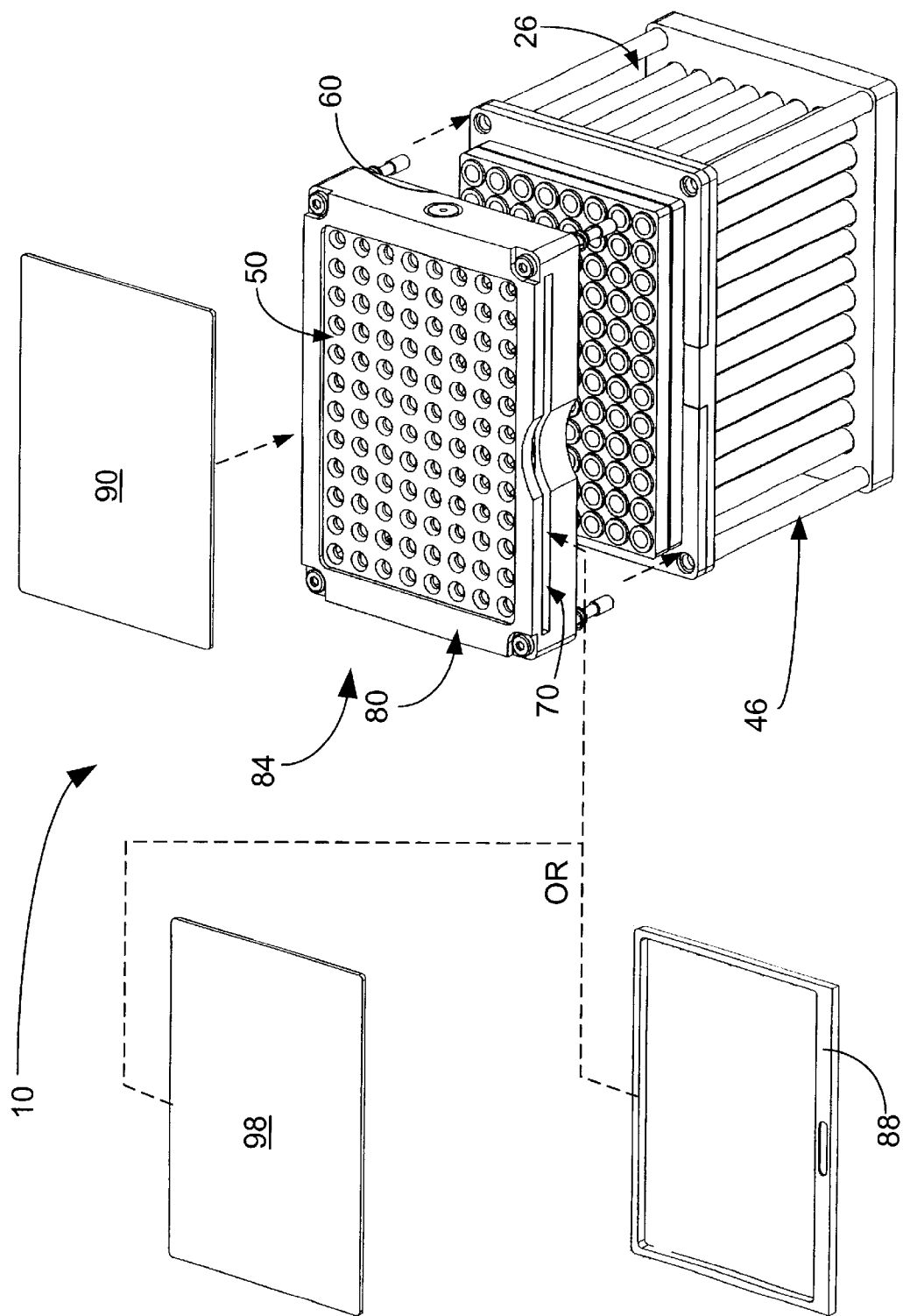
FIG. 1 shows a perspective view of the multi-well array of the present invention.

A preferred embodiment of the present invention is a multi-well array with plenum for performing multiple simultaneous chemical reactions, which are generally done in solution, but which can also be performed on solids. As illustrated in the various drawings herein, and particularly in the view of FIG. 1, a form of this preferred embodiment of the inventive device is depicted by the general reference character 10.

For purposes of this application, the term "plenum" will be used to define a container in which gas, including air, may be at greater than atmospheric pressure, but which may also be kept at a pressure at, or lower than atmospheric pressure, and can thus include a vacuum. An important feature of a plenum, as used in this document, is the isolation of the interior volume of the plenum from the general atmosphere, and therefore, some kind of gas-tight seal is necessary.

FIG. 1 illustrates a completed assembly of the multi-well array with plenum 10. The major assemblies are shown in this view and are discussed in depth in the other figures below. The various assemblies and their components are illustrated in a series of partial views which show steps in the construction of the overall device. The major assemblies shown include the base assembly 46 having a tube array 26, and a upper frame assembly 80 including a top frame hole array 50 and an insertion slot 70. When the upper frame assembly 80 is attached to the base assembly 46, the resulting construction will be referred to as the multi-well assembly 84. A gas plug 88, or alternatively, a lower gasket 98 can be placed into the insertion slot 70 and an upper gasket 90 may be placed to seal the top frame hole array 50. As will be described later, a plenum, or space for pressurized gas, is formed between the top of the tube array 26 and the top frame hole array 50 into which gas can be introduced through gas inlet connector 60.

Figure 2:
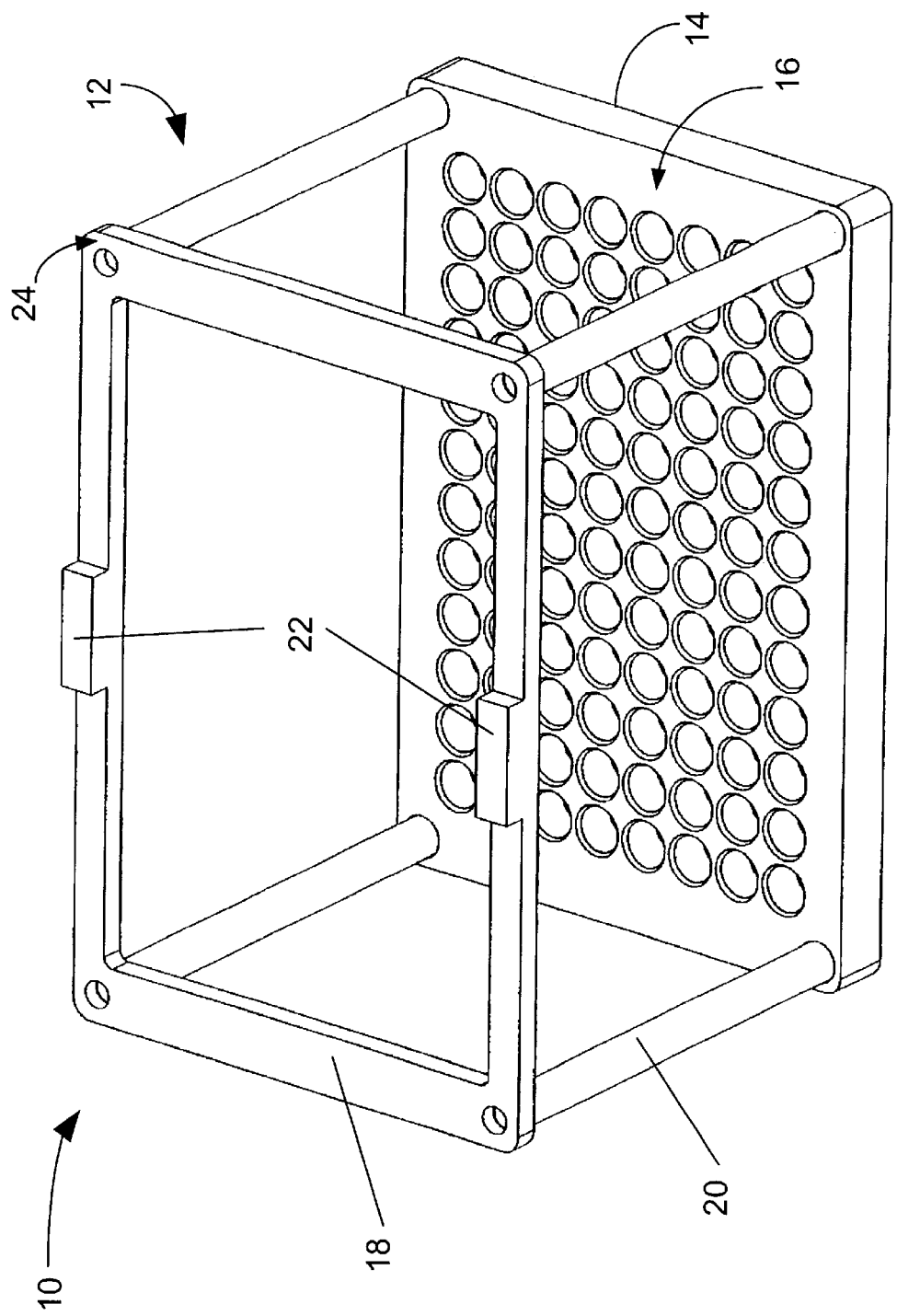
FIG. 2 illustrates a perspective view of the bottom frame of the present invention.

FIG. 2 illustrates a bottom frame 12 which is further made up of a base 14, which contains a bottom hole array 16, and an upper frame 18 which is held at its corners by columns 20. A pair of protrusions 22 can be seen on the upper frame 18. The corners of the frame have mounting holes 24. The bottom frame 12 is preferably made of inexpensive rigid material such as plastic. The bottom hole array 16 illustrated is made up of round holes, but may be made of square depressions or any other polygonal shape to match that of the tubes they are configured to capture, as will be discussed below.

Figure 3:
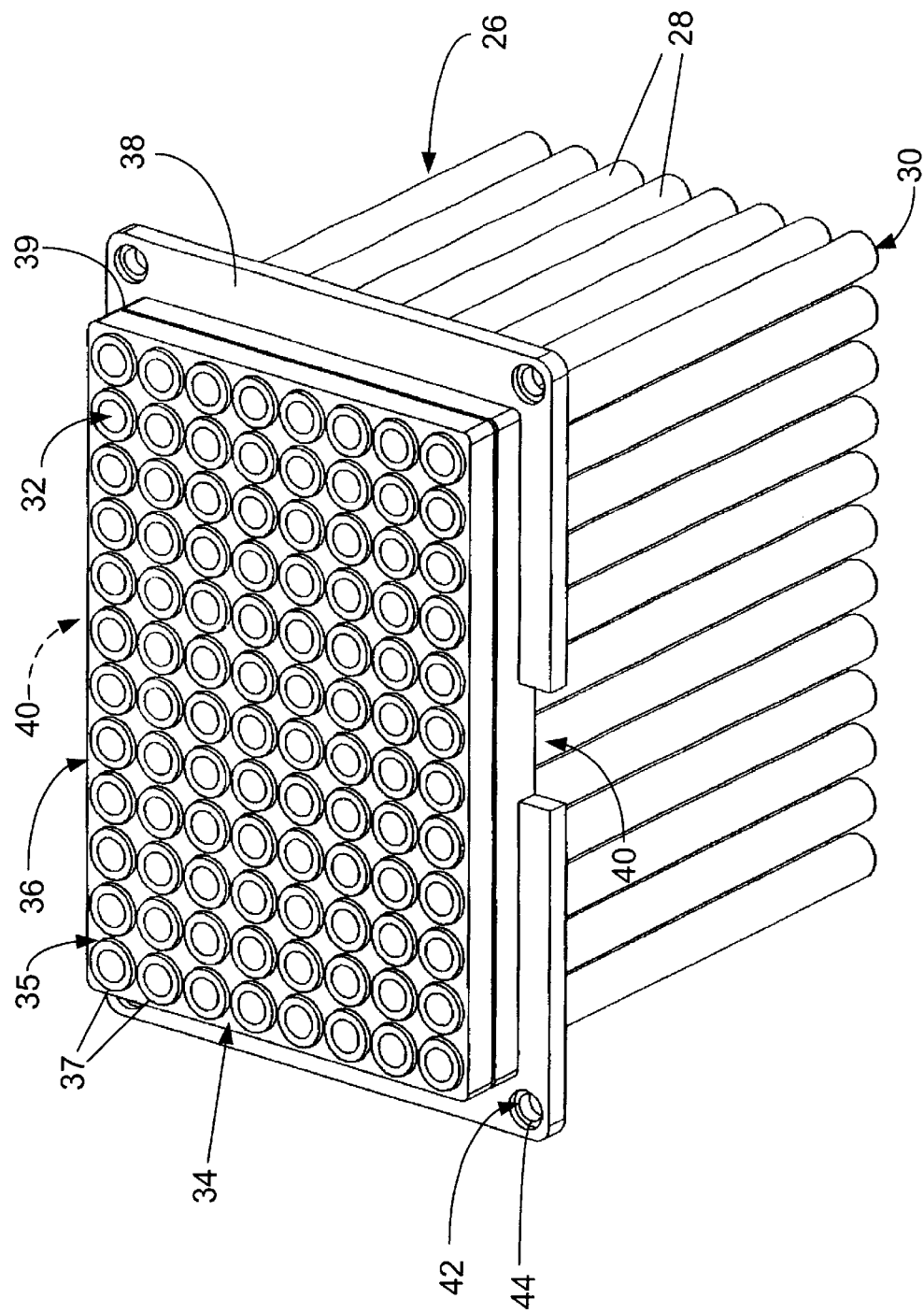
FIG. 3 shows a perspective view of the tube array of the present invention.

FIG. 3 shows a tube array 26, composed of a number of tubes 28. In the embodiment illustrated, this number is 96, being 12 rows of 8 columns, but this number can be subject to considerable variation. The 12×8 arrangement has embodiment in order to easily interface with other laboratory equipment such as multi-channel pipettes. The tubes shown are circular in cross-section, but as mentioned above they may be square, or of any other polygonal shape that matches the shapes of the holes in the bottom hole array 16. Each tube 28 has a closed lower end 30 and an open upper end or mouth 32. The tubes 28 are captured near their upper ends 32 by a rack 34 structure having a number of through holes 35 into which the tubes 28 are placed. The tubes 28 have rims 37 near the mouths 32. The tubes 28 and rack through holes 35 may be of such relative size that the tubes are press-fit into the holes 35. The tube rims 37 prevent the tubes 28 from traveling through the holes 35 entirely. The tube mouths 32 are thus fixed in a tube mouth array 36. The rack 34 also has an O-ring 39 placed in a groove (not visible) around the perimeter of the rack 34.

Also illustrated are the locating notches 40, one of which is not visible in this view, but its position has been indicated by a dashed arrow. Stepped holes 42 having a spring shelf 44 can be seen in each of the corners of the lower mounting collar 38.

Figure 4:
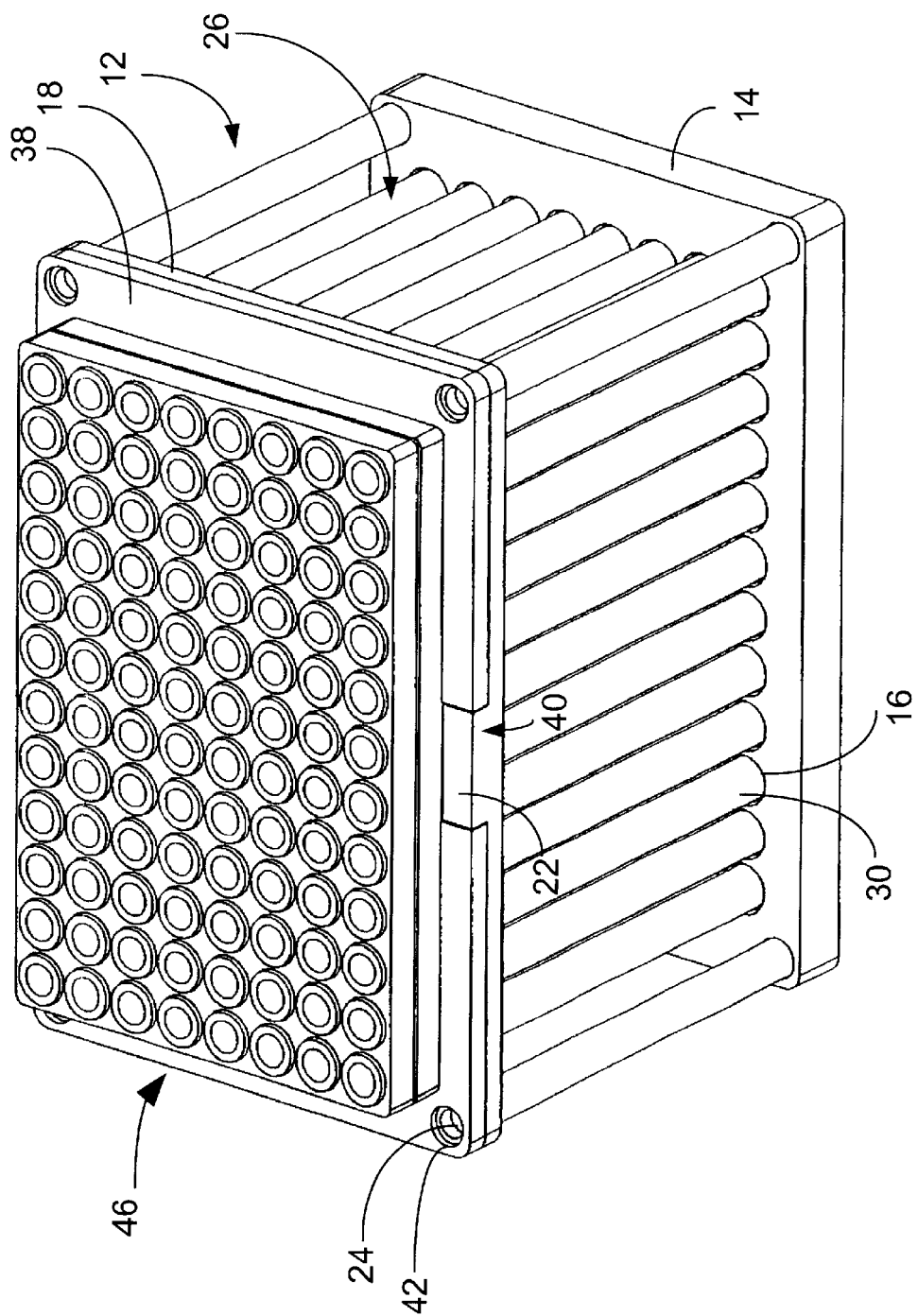
FIG. 4 illustrates a perspective view of the base assembly of the present invention.

FIG. 4 shows the placement of the tube array 26 into the bottom frame 12 to form a base assembly 46. The tube sealed ends 30 have been aligned and inserted into the bottom hole array 16 of the base 14. The lower mounting collar 38 has been placed in contact with the upper frame 18 and the two protrusions 22 on the upper frame 18 have been inserted into the two locating notches 40 formed in the lower mounting collar 38. The stepped holes 42 are thus aligned with the mounting holes 24.

Figure 5:
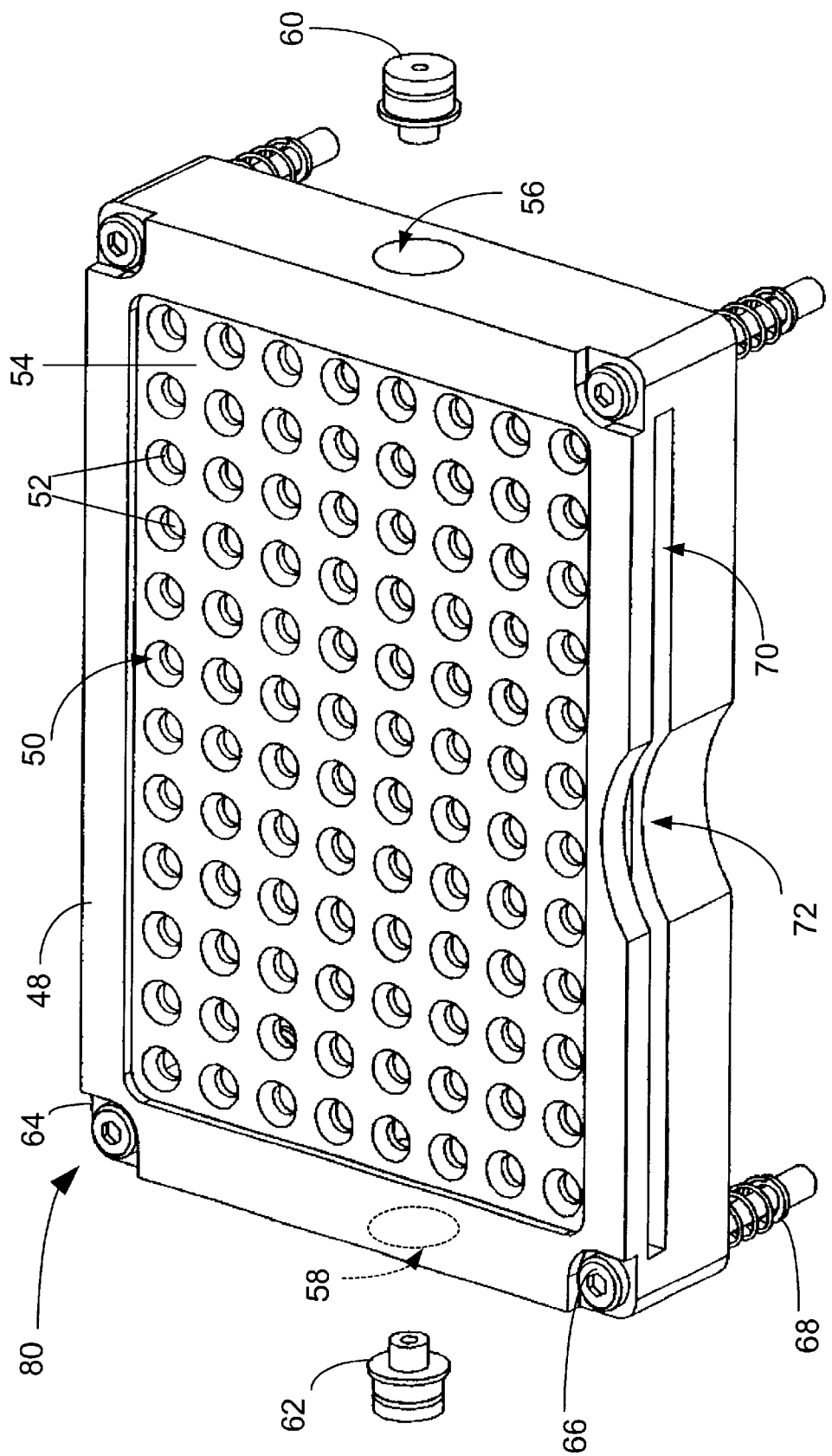
FIG. 5 shows a perspective view of the upper frame assembly of the present invention.

FIG. 5 illustrates the top frame 48, having a top frame hole array 50 composed of a number of top frame holes 52 which are formed in a matrix 54. In the preferred embodiment these holes 52 are optionally of slightly larger diameter at the top of the hole than at the bottom to form small funnel shapes, which may help in directing material into the holes 52. The top frame 48 also includes a gas inlet port 56 and a gas outlet port 58, shown in dashed line. A gas inlet connector 60 and a gas outlet connector 62 are shown which are inserted into the corresponding inlet and outlet ports 56, 58. It is of course possible that both ports be for filling with gas if controlled venting of the gas is not required. For purposes where possibly toxic gases are used, it is desirable to control the outlet of the gas to a confined tube. Thus, the port shown is designated as an outlet port in this view. It also may be desired to conduct reactions at less than atmospheric pressure, in which case both ports could be attached to vacuum lines and would therefore both serve as outlet ports. The nature of the connector valves 60, 62 would thus be correspondingly designed for the nature of the operation (as inlet or outlet valves), and could in fact be designed to be easily replaceable to suit the intended function.

The corners of the top frame 48 have optional recesses 64 which have bolt mounting through holes (not visible). Into these through holes have been placed mounting bolts 66 which have springs 68 placed on their lower portions.

The top frame 48 also has two insertions slots 70, one of which is not visible in this view. A thumb recess 72 has been optionally included, and there may be a second such recess provided on the rear side, which is also not visible in this view. The resulting assembly of these elements will be referred to as the upper frame assembly 80.

Figure 6:
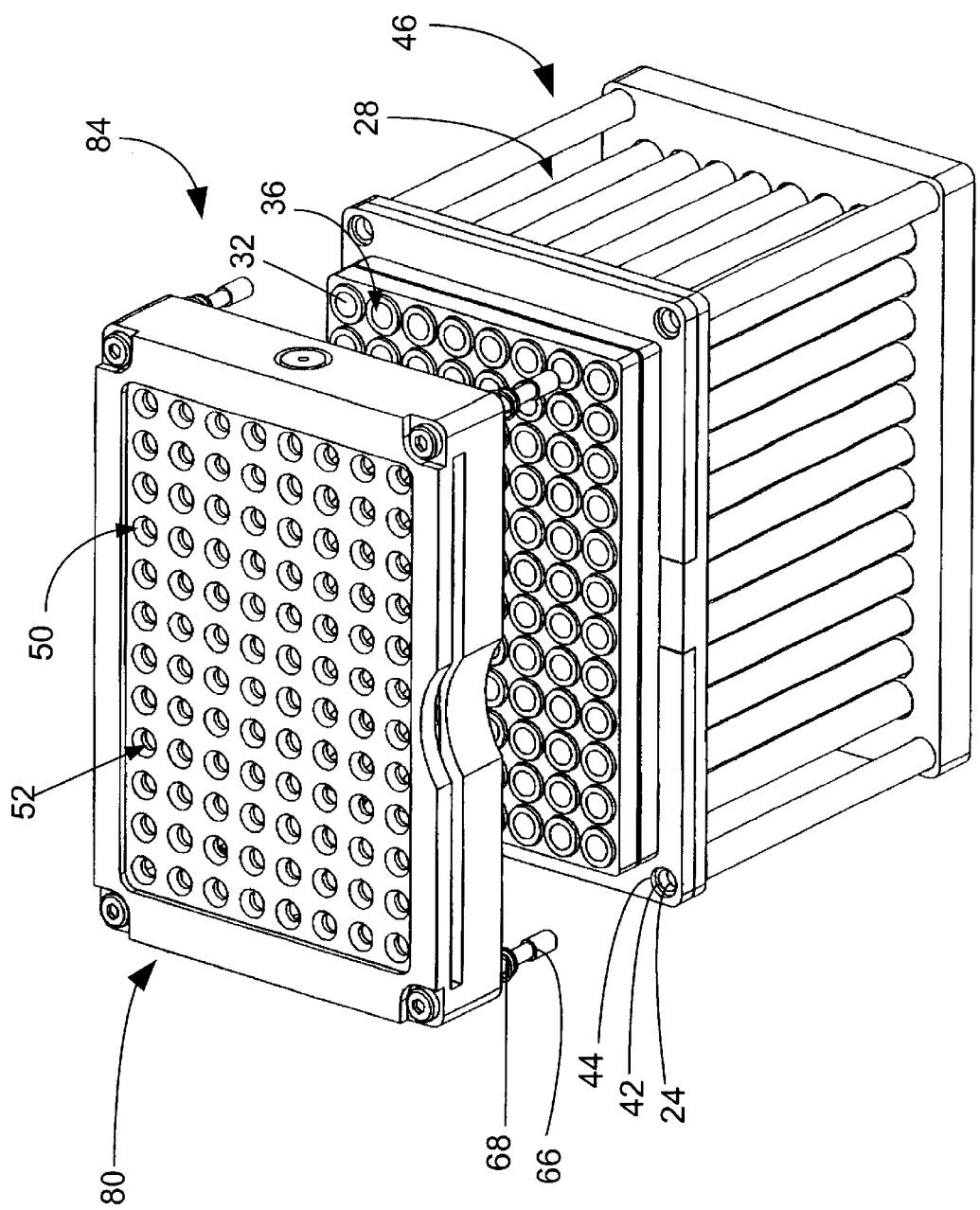
FIG. 6 illustrates a perspective view of the multi-well assembly of the present invention.

FIG. 6 shows the connection of the upper frame assembly 80 to the base assembly 46 to form a multi-well assembly 84. The mounting bolts 66 with their springs 68 are shown. The mounting bolts 66 pass through the stepped holes 42 and screw into the mounting holes 24. The springs 68, being of larger diameter than the bolts 66, contact the spring shelf 44 of the stepped holes 42. The springs 68 thus are compressed as the mounting bolts 66 are tightened, and act to bias the upper frame assembly 80 upwardly away from the base assembly 46. The compressed length of the springs 68 is short enough however that the upper frame assembly 80 can fully contact the base assembly 46 to form a gas tight seal when the mounting bolts 66 are fully tightened.

When the multi-well assembly 84 has been completed, the holes 52 in the top frame hole array 50 are in alignment with the mouths 32 of the tube mouth array 36. Thus, material may be easily introduced into the tubes 28.

Figure 7:
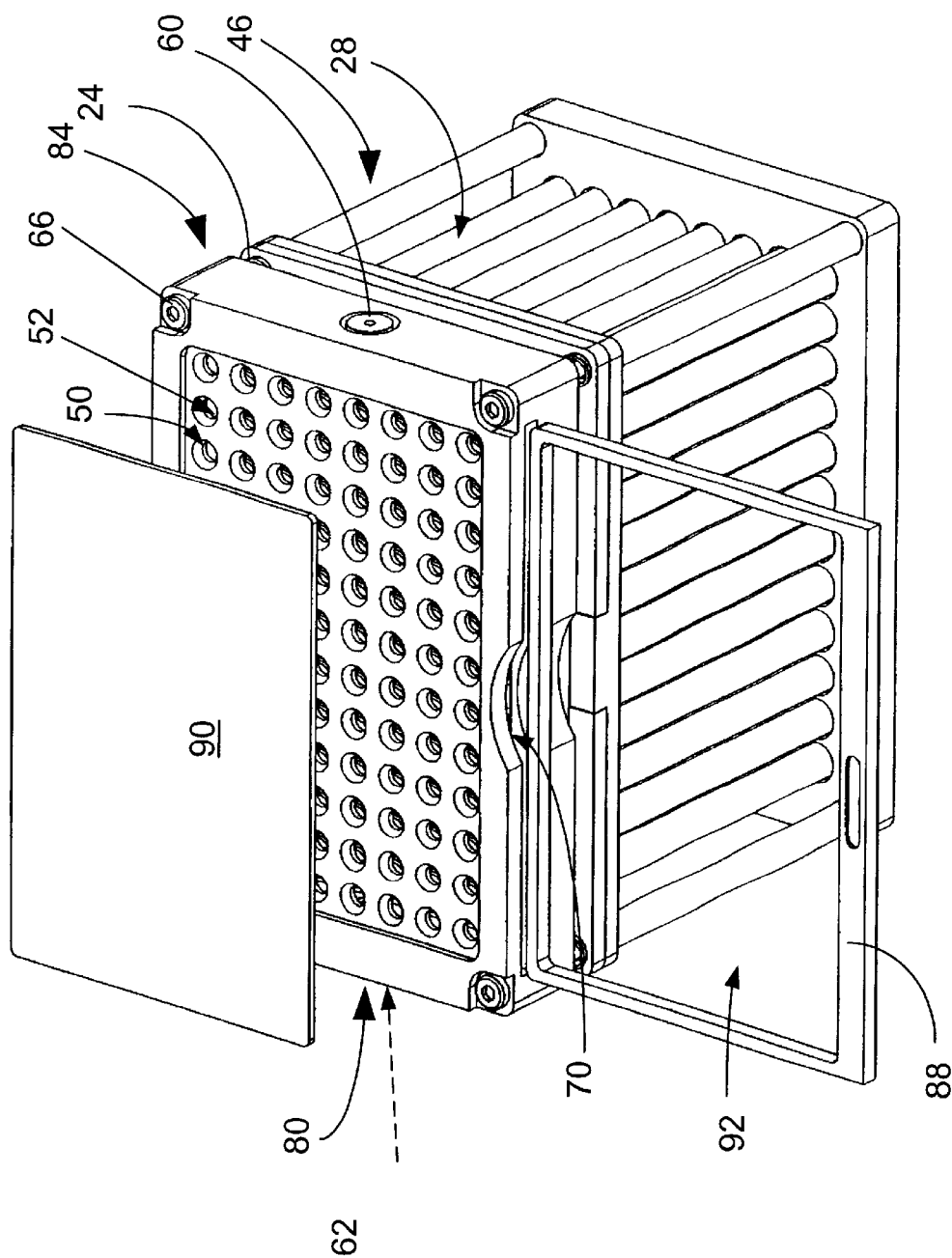
FIG. 7 shows a perspective view of the multi-well assembly with the gas plug and upper gasket of the present invention.

FIG. 7 illustrates the multi-well assembly 84 in which the mounting bolts 66 have engaged the mounting holes 24, but have not been fully tightened to draw the upper frame assembly 80 down onto the base assembly 46. The springs 68 thus act to keep the upper frame assembly 80 raised, thus allowing an open space or plenum (not visible in this view) to be formed. The purpose of this plenum is to hold gas, often at greater than atmospheric pressure. In order to prevent such from escaping, a gas plug 88 can be inserted into the slot 70, and an upper gasket 90 can be placed on the top frame hole array 50. The inlet connector 60 and outlet connector 62 act as valves, which when closed, act to maintain the gas pressure in the plenum. When sealed in this manner, it may still be desirable to introduce material to the tubes 28, therefore the upper gasket 90 may be made of material which allows needle penetration through the gasket 90 and top frame holes 52 into the tube mouths 32 (not visible in this view). To this purpose, the gas plug 88 is made to be a frame shape with a large central opening 92, so that needle penetration is not impeded.

It will be obvious to those skilled in the art that a great variety of mechanisms may be used to prevent the gas from escaping from the plenum, and thus the function of the gas plug 88 may be performed in many different ways. For example, there may be only a single insertion slot into which a bar-shaped plug may be placed. Alternately, there may be only a small panel or door over each slot or slots, perhaps spring biased to automatically close.

Figure 8:
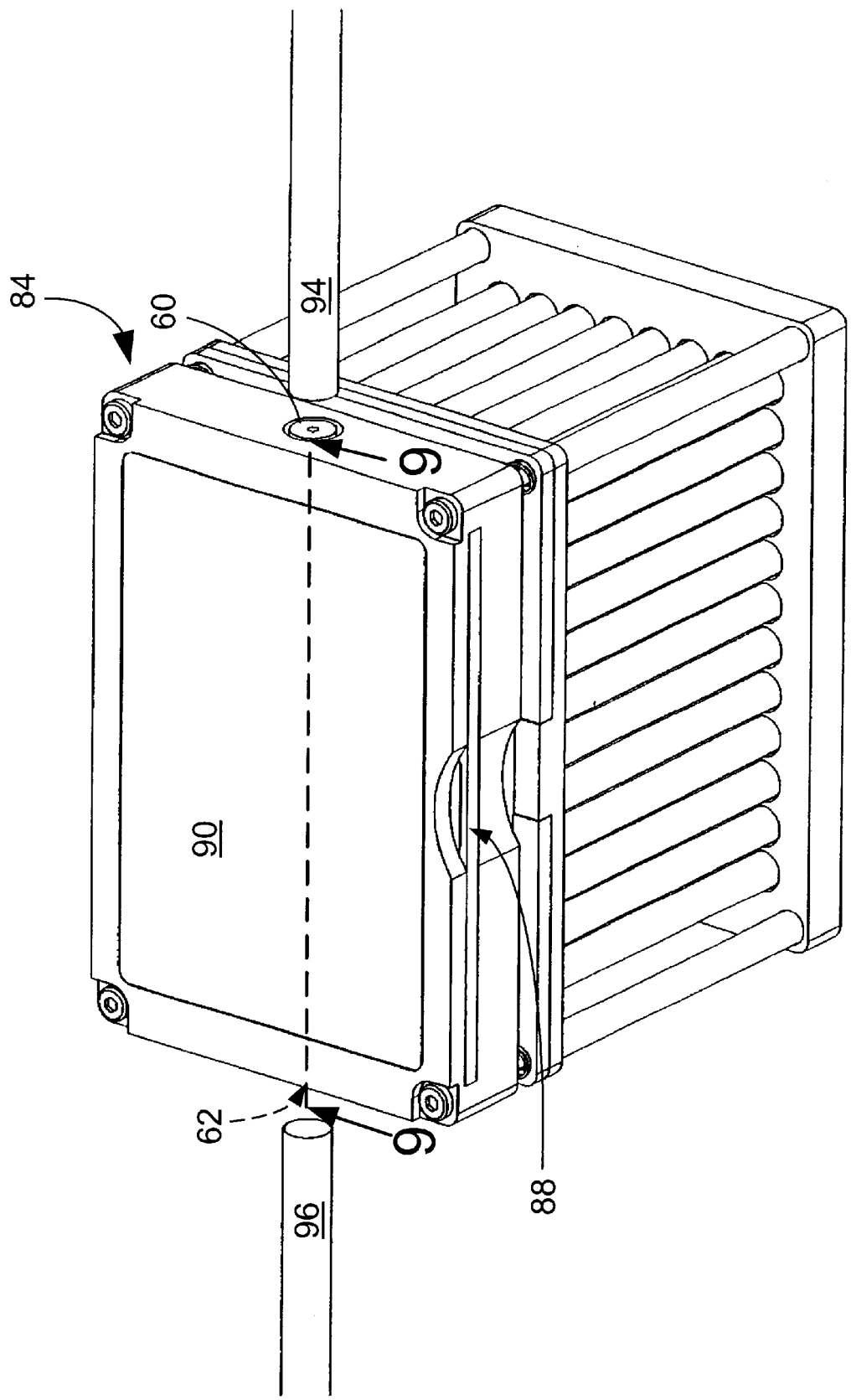
FIG. 8 illustrates a perspective view of the multi-well assembly with the gas plug and upper gasket in place in the present invention.

FIG. 8 shows the multi-well assembly 84 with gas plug 88 and upper gasket 90 in place. A gas filling tube 94 and a gas evacuating tube 96 are attached to the gas inlet connector 60 and outlet connector 62 (not visible in this view) in preparation for filling the plenum with gas.

Figure 9:
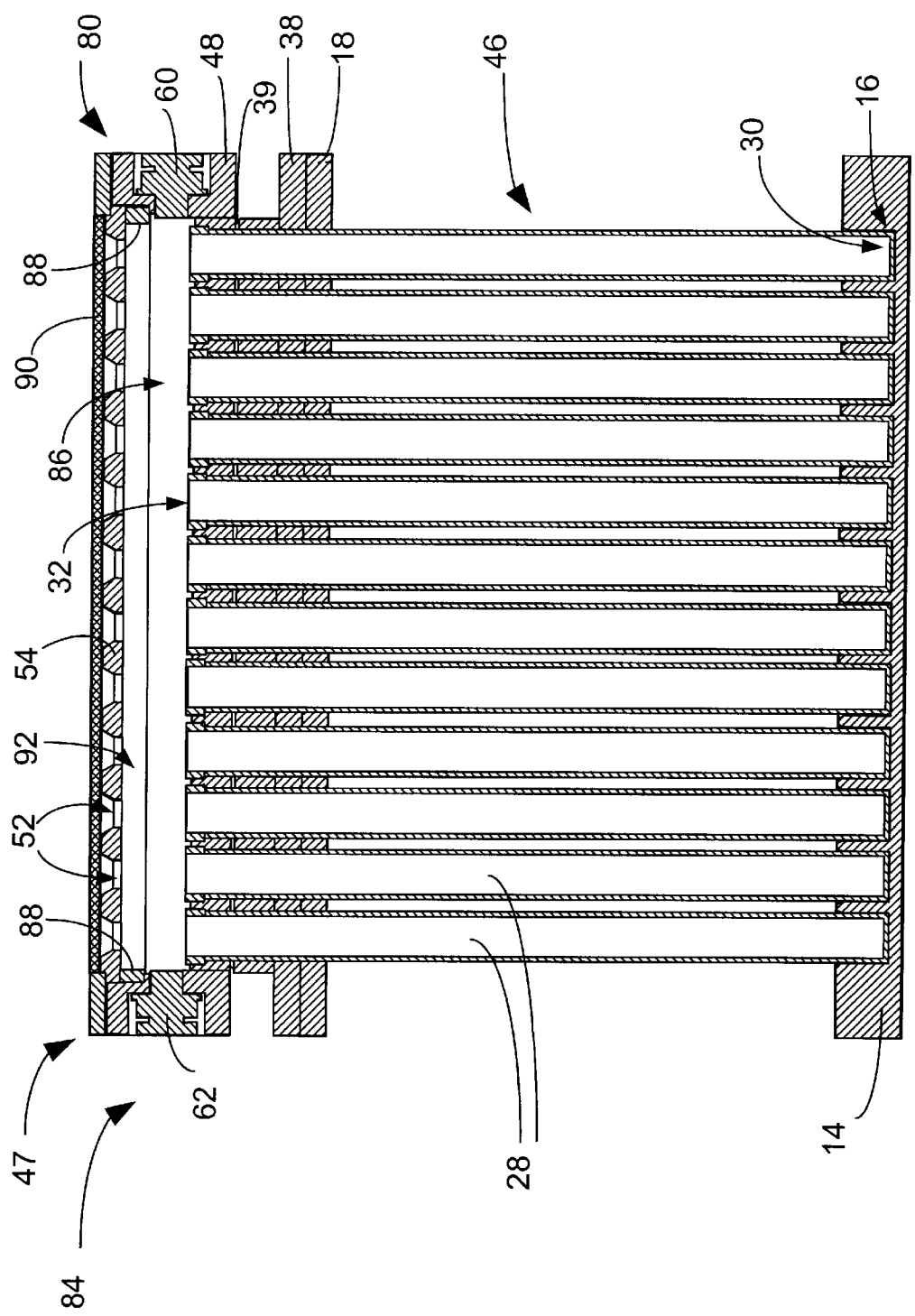
FIG. 9 shows a front cut-away view of the multi-well array of the present invention as taken through line 9—9 in FIG. 8.

FIG. 9 illustrates a cut away front view of a multi-well assembly 84 of the present invention as taken through line 9—9 in FIG. 8. The upper frame assembly 80 is shown raised up from the base assembly 46 (open position 47) as the mounting bolts (not visible in this view) have not been tightened to draw the upper frame assembly 80 downward. The upper frame 18 and lower mounting collar 38 thus are separated from the upper frame 48 by a gap. O-ring 39 helps to form a gas-tight seal with the top frame 48. Although not necessarily aligned, a row of tubes 28 and the gas inlet connector 60 and gas outlet connector 62 are shown to be exactly bisected by the cutting plane. The tube sealed ends 30 are shown to be inserted into the bottom hole array 16 of the base 14. The alignment between the top frame holes 52 and the tube mouths 32 can be seen. The top gasket 90 and the gas plug 88 are also shown, although the rear wall of the gas plug 88 is located well back from the cutting plane, and thus is not shown in cross-hatch except for the two side pieces which surround the central opening 92. The plenum 86 is shown between the tops of the tube mouths 32 and the top frame matrix 54. When material is to be introduced into the tubes 28 a needle can be passed through the upper gasket 90, through one of the top frame holes 52, and into the mouth 32 of the aligned tube 28. The upper gasket 90 can be made of "self-healing" material in which the hole made by the needle automatically reseals after the needle is withdrawn, thus keeping the gas contained within the multi-well assembly 84.

Figure 10:
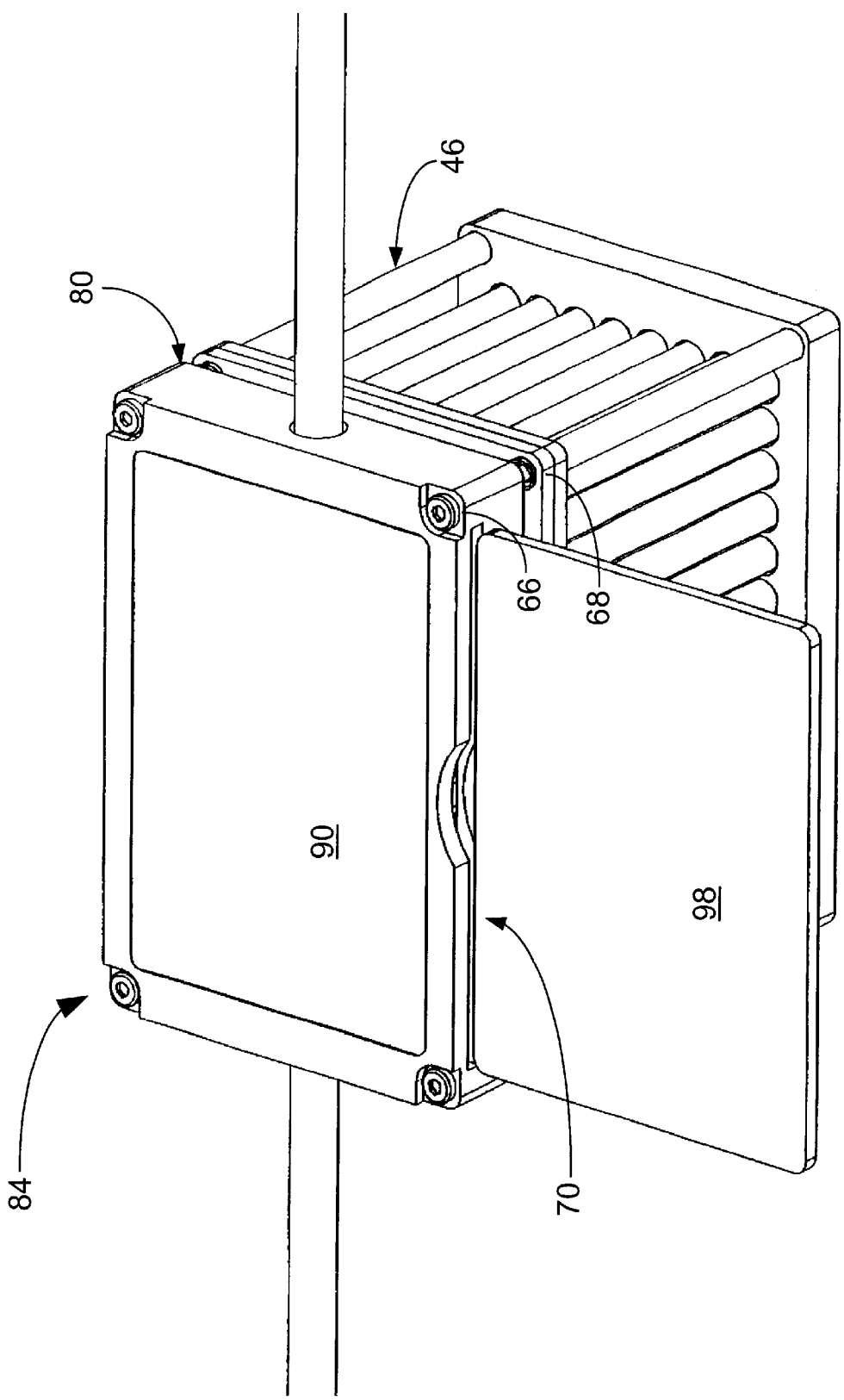
FIG. 10 illustrates a perspective view of the multi-well assembly with the lower gasket in place for insertion, while the device is in the "open position"

FIG. 10 shows a multi-well assembly 84 after being filled with gas. The gas plug (not shown) is removed from the insertion slot 70. For sealing the tubes (not shown) after being filled with gas, a lower gasket 98 is placed in the insertion slot 70 and slid into position above the tube mouths (not visible). At this point, the upper frame assembly 80 is still raised above the base assembly 46 by the bias action of the springs 68 captured on the mounting bolts 66.

Figure 11:
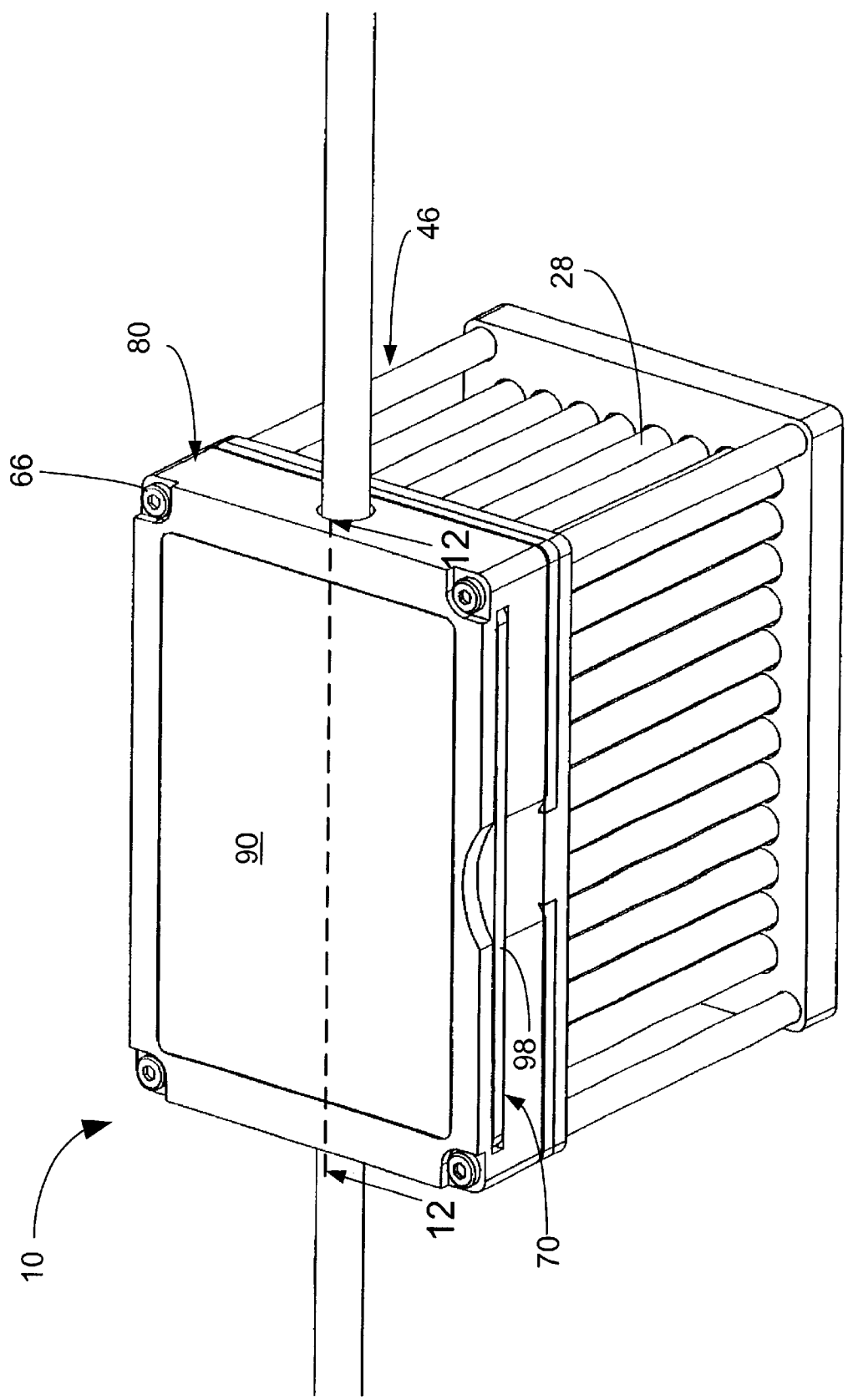
FIG. 11 shows a perspective view of the multi-well array with the lower gasket inserted and the device in the "closed position"

FIG. 11 illustrates the device 10 after insertion of the lower gasket 98. The mounting bolts 66 have been tightened to draw the upper frame assembly 80 down onto the base assembly 46. This also causes the lower gasket 98 to press against the tube mouths (not visible), thus providing a gas and liquid-tight seal. The device 10 may then be safely agitated and even inverted without spilling the material contained in the tubes 28. The lower gasket 98 can be made of self-healing material, in the same manner as the upper gasket 90, so it may still be possible to add material to the tubes 28. After the lower gasket 98 has been installed, the top gasket 90 can be optionally removed.

Figure 12:
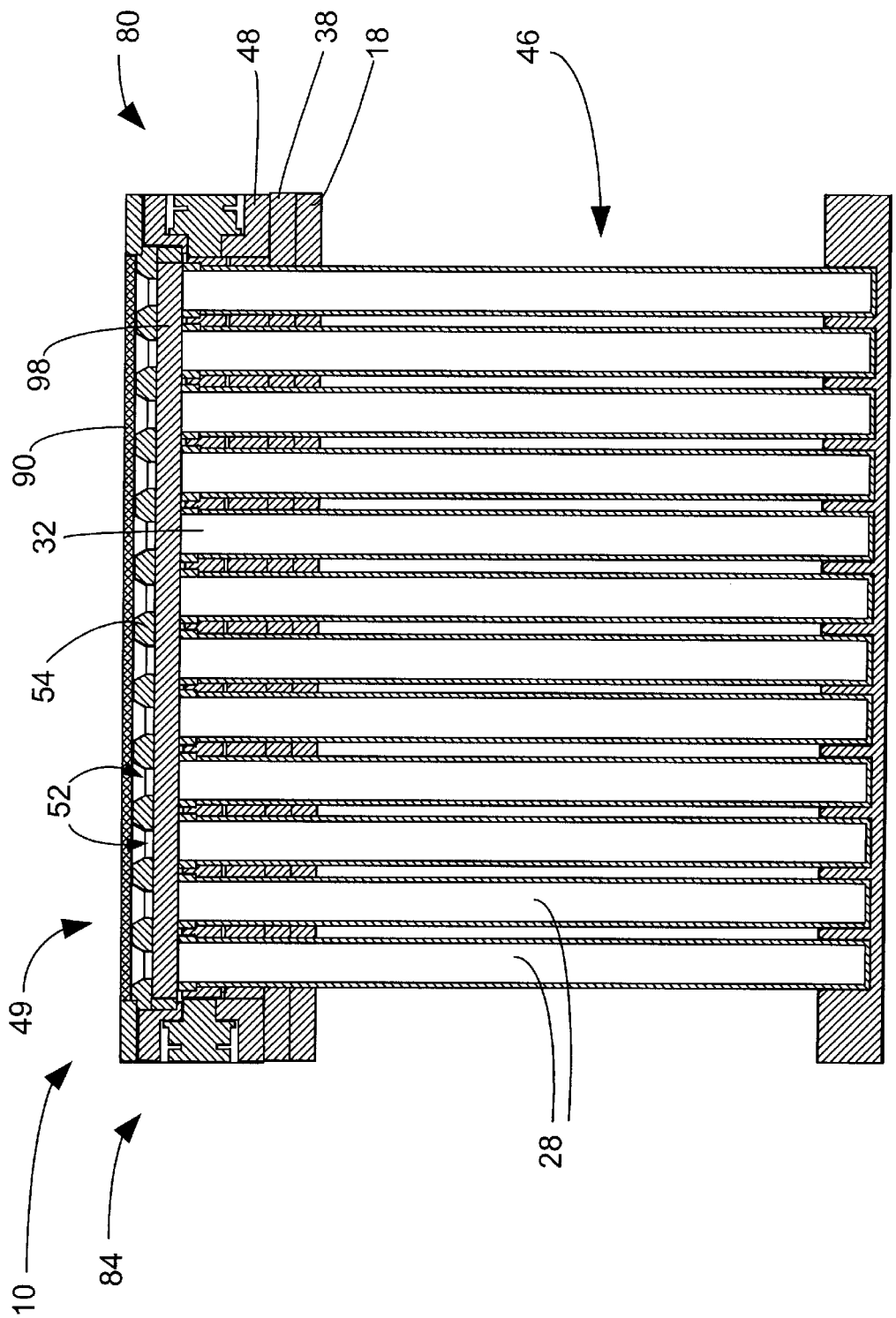
FIG. 12 shows a front cut-away view of the multi-well array of the present invention as taken through line 12—12 in FIG. 11.

FIG. 12 illustrates a cut away front view of a multi-well array 10 of the present invention as taken through line 12—12 in FIG. 11. The upper frame assembly 80 is shown closed down (closed position 49) onto the base assembly 46 as the mounting bolts (not visible in this view) have been tightened to draw the upper frame assembly 80 downward. The upper frame 18 and lower mounting collar 38 thus are in contact with top frame 48. The top gasket 90 and lower gasket 98 are also shown, with the lower gasket 98 pressed onto the mouths 32 of the tubes 28. Assuming that the top gasket 90 is not removed, when material is to be introduced into the tubes 28 a syringe needle can be passed through the upper gasket 90, through one of the top frame holes 52, through the lower gasket 98 and into the mouth 32 of the aligned tube 28. As mentioned above, the upper gasket 90 and lower gasket 98 can be made of "self-sealing" material in which the hole made by the needle automatically reseals after the needle is withdrawn, thus keeping any charged gas contained in the tubes 28.

The multi-well array 10 of the present invention is useful for analysis, testing, purification, synthesis, separation, extraction, processing and other manipulations of chemical compounds and biological materials. The wells are preferably configured in standard 96-well format that easily interfaces with other standard laboratory liquid handling and batch processing equipment such as a multichannel pipette, and has a standard microplate footprint, although this is not to be considered a limitation. In fact, the present invention can be used with any ordered array of any number of vials, tubes, wells or containers. The terms "tube" and vial will be used interchangeably to indicate this broad range of acceptable containers. As discussed above, the tubes 28 in the tube array 26 may be square or rectangular in cross-section, as well as round, as shown. The length of the tubes 28 may vary to accommodate larger volumes by providing longer columns 20 on the base assembly 46, while still maintaining the standard microplate footprint. It is also contemplated by the present invention 10, that the tubes 28 may be either completely removable, or alternately, they may be integrally formed into a unitary block, so that for instance the tube array 26 shown in FIG. 1 could be a single piece, removable as a single item from the base assembly 46.

Generally, a synthesis is performed by placing material with any solvents and air-stable reagents in the tubes 28 of the tube array 26 by using, for example, a multichannel pipette. This is generally performed before the upper frame assembly 80 is attached to the base assembly 46, (although the top frame hole array 50 allows this step to be performed after attachment if desired). The upper frame assembly 80 is then attached by aligning the mounting bolts 66 with the stepped holes 42 of the base assembly 46 with the captured springs 68 resting on the spring shelves 44 of the same stepped holes 42. The mounting bolts 66 are not tightened so that the upper frame assembly 80 is raised from the base assembly 46 by the biasing action of the springs 68 so that a plenum 86 is formed between the tops of the tube mouths 32, and the top frame matrix portion 54. If a gas, such as argon, is to be introduced into the plenum 86, the gas plug 88 is inserted into the insertion slot 70 and the upper gasket 90 is place on the top frame hole array 50 to block the top frame holes 52. The gas plug 88 side members rest on narrow shelves inside the top frame 48, which support the gas plug 88 above the gas entrance path from the gas inlet port 56 to the plenum 86, so that the gas flow is not impeded. Gas filling tube 94 is connected to the gas inlet connector 60. Gas flows into the plenum 86 and hence into the tube mouths 32. Argon gas is useful for many purposes, as it is heavier than air, and pushes air out of the tubes 28 as it enters. The resulting layer of argon gas can thereafter exclude air from entering the tubes and thus keep out unwanted components of air such as oxygen and water vapor, which may interfere or adversely participate in certain chemical reactions. Of course, the present invention is useful for introducing many other types of gases, including those which may be volatile in air, or harmful to laboratory personnel. In this case an evacuation system such as a gas evacuating tube 96 can be established through the outlet port 58, so that gas is contained at all points in its usage.

After the gas has filled the plenum 86 and tubes 28, further material may be introduced in the tubes 28 by using a syringe or array of syringes which can penetrate the upper gasket 90 and pass through central opening 92 of the gas plug 88 as well as the top frame holes 52 to reached the aligned tube mouths 32 below. The gas plug 88 can then be withdrawn and the lower gasket 98 introduced into the insertion slot 70. When it is in place, the mounting bolts 66 can be tightened to draw the upper frame assembly 80 onto the base assembly 46. The lower gasket 98 is thus pressed onto the tube mouths 32 and the tubes 28 sealed. The upper gasket 90 may then optionally be removed. If a self-healing material is used for the lower gasket 98, material may be introduced into the tubes at this stage as well, whether the upper gasket 90 has previously been removed or not.

Alternately, the gas plug 88 can take the shape of one or more small door panels which close over the insertion slots 70. A lower gasket 98 can be introduced through this open door to the insertion slot 70 where it may rest on narrow shelves out of the gas fill path. Gas filling is performed, and then the mounting bolts 66 tightened to press the lower gasket 98 onto the tube mouths 32. The resulting increased pressure in the gas may be useful for some applications, or it may be vented out through the gas outlet port 58, perhaps into an evacuation tube 96.

When engaged, the lower gasket 98 presents a liquid and gas-tight seal which allows for safe agitation of the contents of the tube array 26 without fear of cross contamination. The array 10 may also be inverted without leakage.

When the manipulations of the material are complete, the mounting bolts 66 are loosened, and the springs 68 push the upper frame assembly 80 to separate from the base assembly 46. The fill gas may be evacuated or vented during this process. The upper frame assembly 80 is removed, and the lower gasket 98 unsealed from the tube array 26. The contents can then be examined or sampled. It is possible to maintain the gas layer in the tubes 28 for certain types of gas such as argon which, being heavier than air, will tend to remain unless drawn off.

Figure 13:
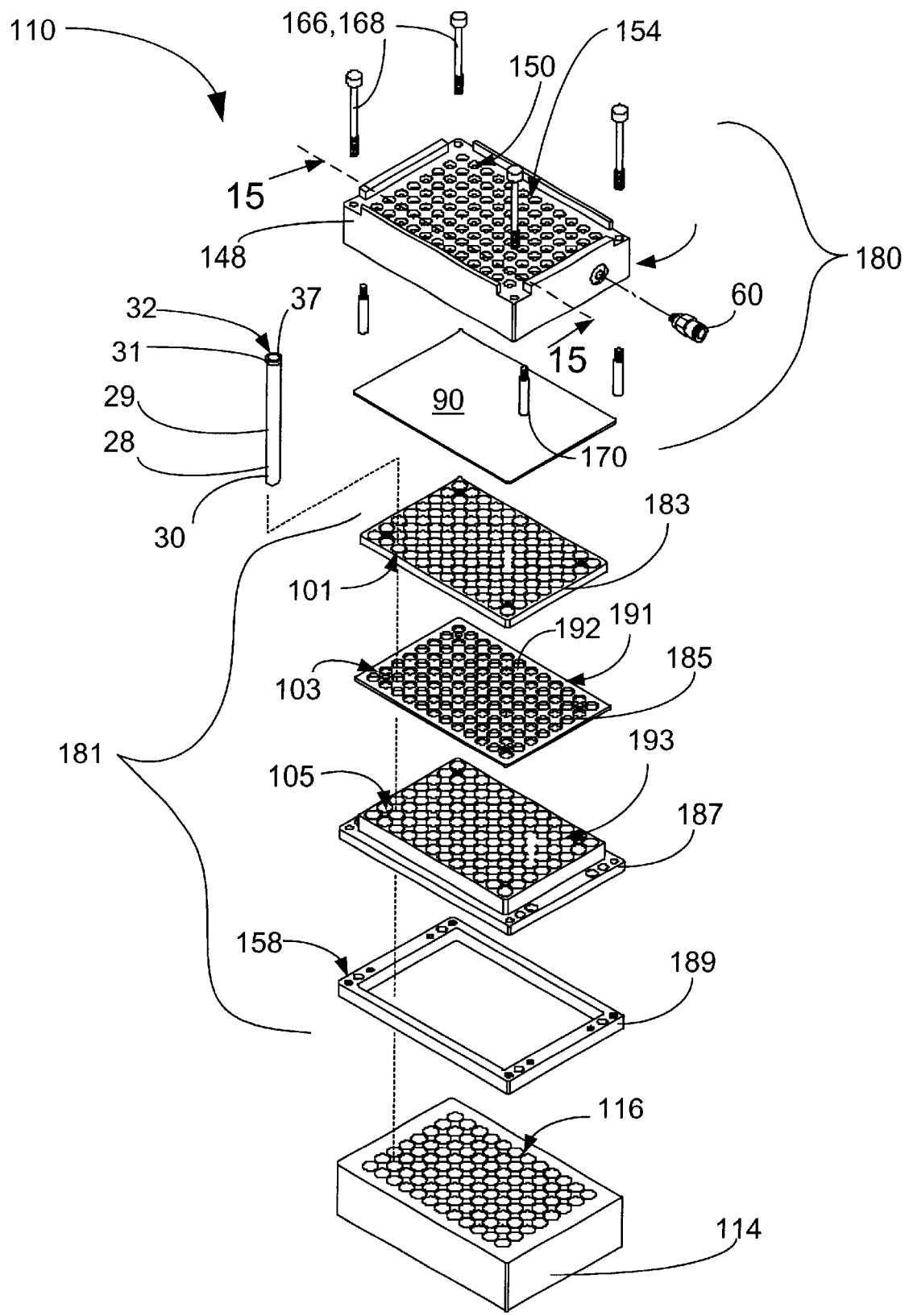
FIG. 13 shows an exploded perspective view of an alternate embodiment of the present invention.

An alternate embodiment of the present invention, which is now most preferred, is shown in FIG. 13. This alternate embodiment is generally indicated by the reference number 110, and where possible, element numbers that are analogous to those used in the first embodiment will be used with the preface "1".

Figure 14:
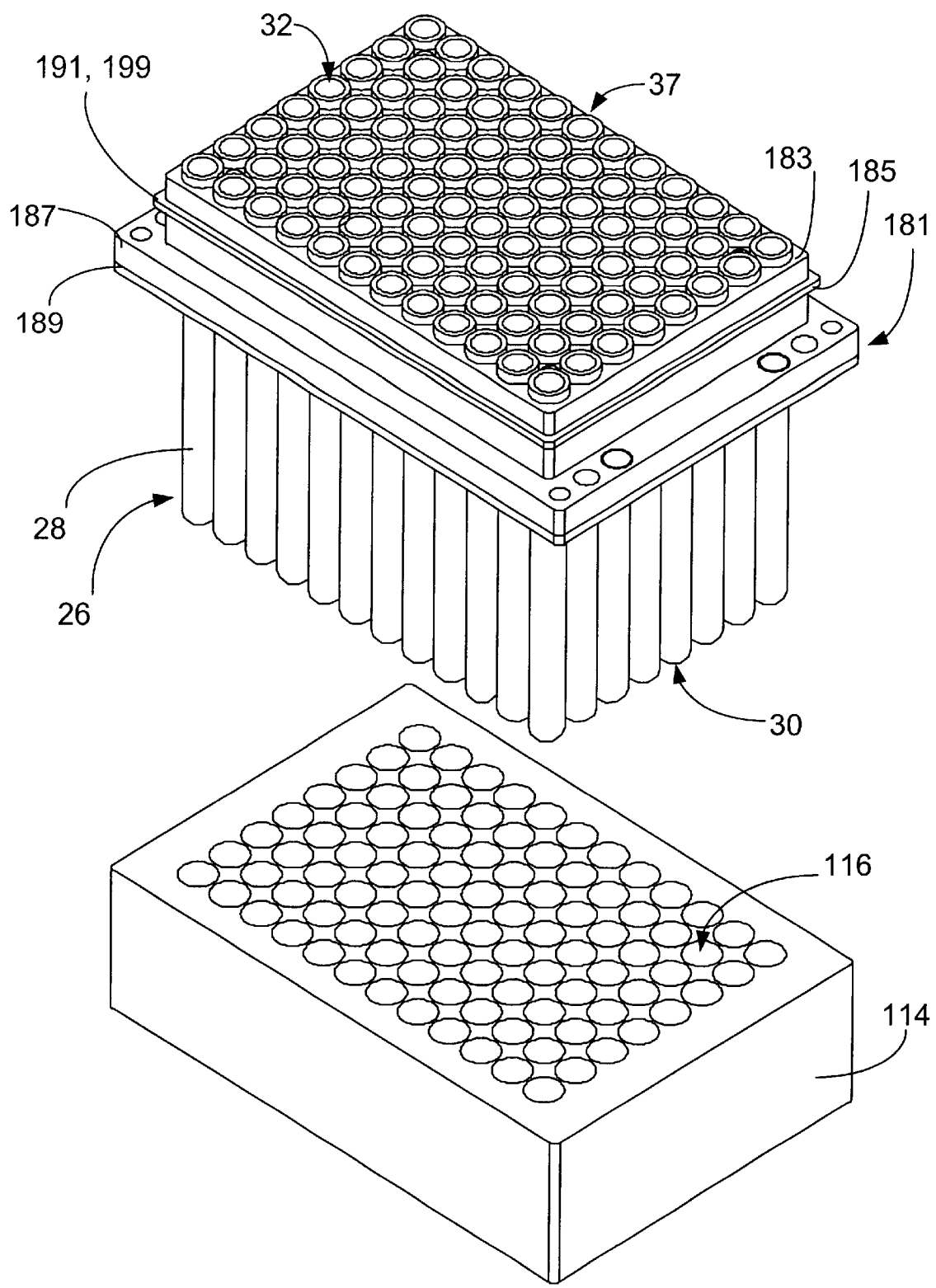
FIG. 14 illustrates a front perspective view of the lower frame assembly, vial array, and base of the present invention.

Referring now to FIGS. 13 and 14, the multi-well array with adjustable plenum 110 has a base 114 which has a bottom hole array 116. A upper frame assembly 180 has a top frame 148 including a matrix portion 154 surrounding a top frame hole array 150. There are four mounting bolts 166, acting as an adjustment mechanism 168, by which the upper frame assembly is attached to the rest of the apparatus, and by which adjustment of the plenum volume is made. It is to be understood that many other types and designs of adjustment mechanisms are possible. Some other variations include lead screws, guide posts with slide mechanisms and clamps, removable spacers which establish different plenum volumes, and there may be spring mechanisms which help to maintain the plenum volume against atmospheric pressure when a vacuum is introduced. The upper frame assembly also includes an upper gasket 90, and optionally includes guide rods 170, which help to direct the travel of the upper frame assembly 180 relative to the lower frame assembly 181.

The lower frame assembly 181 will be considered to include a top vial holder 183, a gasket vial holder 185, a bottom vial holder 187 and a metal support 189. The metal support 189 is used to provide extra rigidity and to provide a strong foundation for the tapped holes 158.

The tubes or vials 28 each have a sealed end 30 and an open mouth 32, which is surrounded by a tube rim 37. The lower sealed ends 30 of the vials 28 are placed through the holes 101 in the top vial holder 183, then through the holes 103 in the gasket vial holder 185, and the holes 105 in the bottom vial holder 187 until the tube rim 37 contacts the top vial holder 183 and prevents further downward travel. The holes 101, 103, 105, are all, of course, aligned.

The holes 103 in the gasket vial holder 185 are somewhat smaller in diameter so that the barrel 29 of each vial 28 is held snuggly by the material of the gasket vial holder 187. The gasket vial holder 185, as the name implies, performs a dual function. As a vial holder, the matrix portion 192 between the holes 103 serves to isolate the vials 28 from collision with their neighbors or from the harder material of the top vial holder 183 and bottom vial holder 187, prevents spillage, and maintains the vials 28 in ordered array, which is very useful for shipping and handling considerations. In addition, the gasket vial holder 185 can prevent the vials 28 from rattling if the apparatus 110 is agitated, and from falling out if the apparatus is inverted. In its function as a gasket, the matrix portion 192 of the gasket vial holder 185 between the holes 103 can optionally provide a gas-tight seal 197 (see FIG. 15, below) around the barrels 29 of the vials 28. The gasket vial holder 185 in order to fit snuggly around the vials 28, form a gas-tight seal, and to cushion the vials 28, is preferably made of flexible material, perhaps elastomeric material, which easily deforms. In order to add rigidity, it may be desirable to attach the gasket vial holder 185 to at least one rigid plate, or preferably to sandwich it between two rigid plates, such as the top vial holder 183 and the bottom vial holder 187. To the inventors' knowledge, this dual purpose feature of the gasket vial holder 185 is unknown in the art and is assertedly a novel feature in itself.

The sealed ends of the tubes 30 are then inserted into the holes 116 in the base 114, so that the entire array of tubes or vials 28 is supported and surrounded at their lower ends 30 by the base 114. The base 114 may also have slots or mounting grooves configured to fit in the carrier apparatus and oven described in application 08/972,996, now U.S. Pat. No. 6,054,100, filed by the same inventors. The base 114, and the apparatus as a whole, preferably maintains a standard microplate footprint, which has many advantages in compatibility with other laboratory equipment, and in automated processing and other batch processing equipment.

As in the previous embodiment 10, it is also contemplated by the presently described embodiment 110, that the tubes 28 may be either completely removable, or alternately, they may be integrally formed into a unitary block. The vial 28 illustrated in FIG. 13 is shown as a single detached vial for simplicity of illustration, but it should be understood that the vial array 26 shown in FIG. 14 could alternately be a unitary piece, perhaps with the tube rims 37 joined together so that the vial array is removable only as a single piece. Also, as before, it should be understood that the number and configuration of vials is not limited to an 8×12 array of 96 vials, but can be any number, size and order of containers.

As seen in FIGS. 13 and 14, the gasket vial holder 185 is preferably larger in width and length than the top vial holder 183 and the top portion of the bottom vial holder 193, so that a perimeter portion 191 of the gasket vial holder 185 can be seen when sandwiched between the top vial holder 183 and the top portion 193 of the bottom vial holder 187. This perimeter portion 191 is crucial in creating the gas-tight seal of the plenum, as will be seen below.

Figure 15:
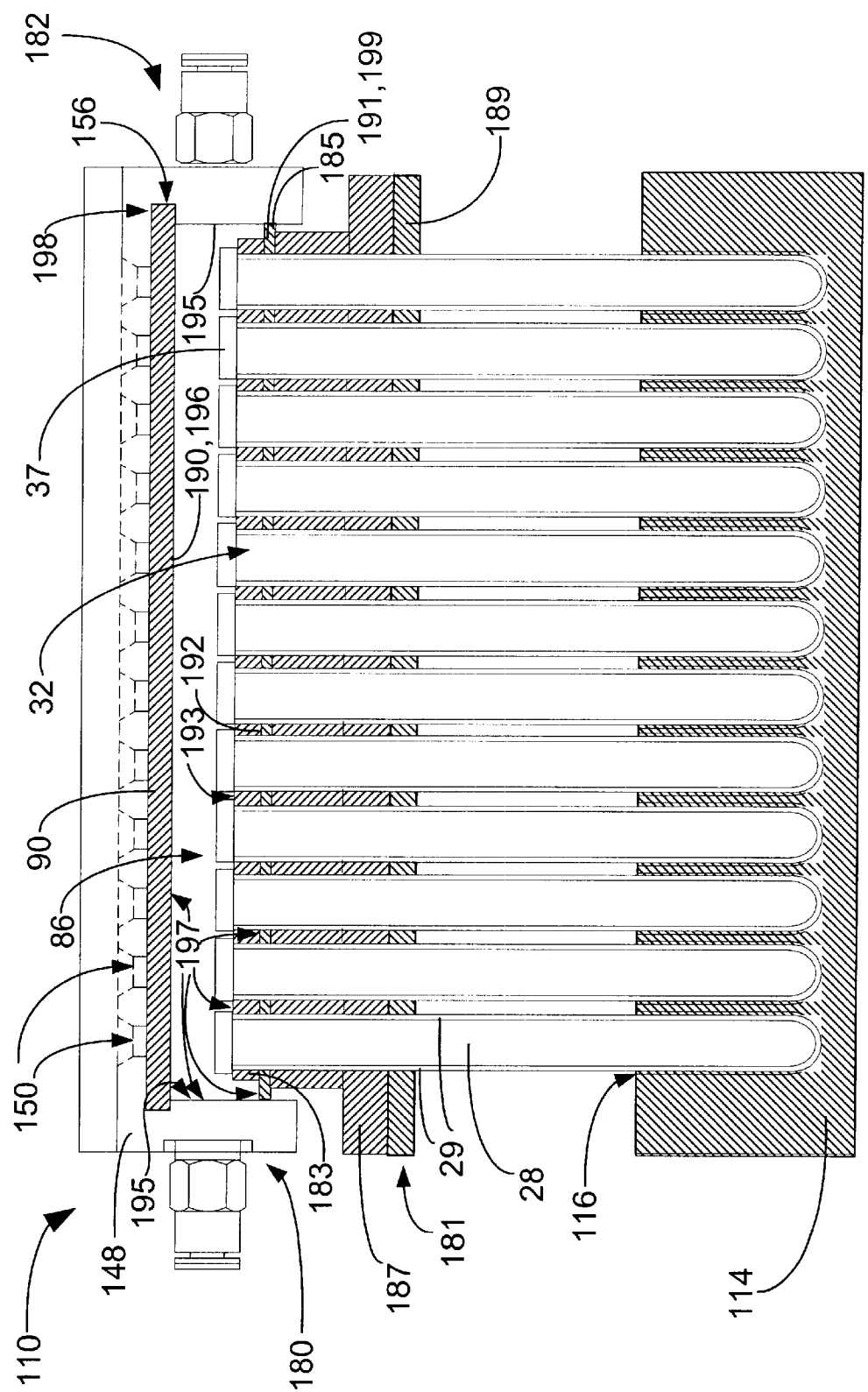
FIG. 15 shows a side cut-away view of the present invention as taken through line 15—15 in FIG. 13, with the upper frame assembly raised to allow creation of the plenum.
Figure 16:
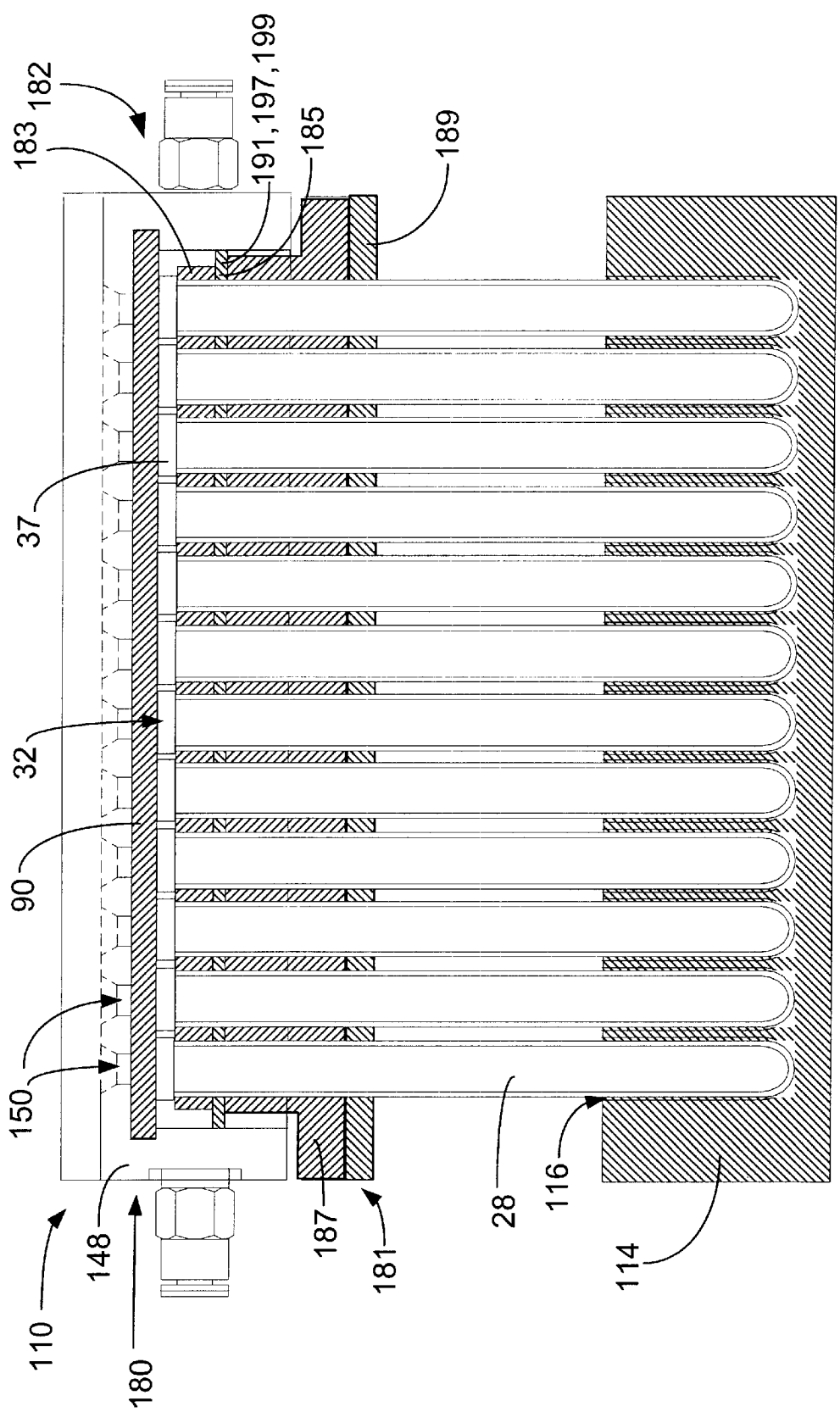
FIG. 16 shows a side cut-away view of the present invention as taken through line 15—15 in FIG. 13, with the upper frame assembly lowered to seal the mouths of all the vials.

FIGS. 15 and 16 show cross-sectional views of a multi-well array with adjustable plenum 110 in which the top frame 148, upper gasket 90, top vial holder 183, gasket vial holder 185, bottom vial holder 187, metal support 189, vials 28 and base 114 can be seen. The mounting bolts, portions of which may technically have been visible in this view, are not shown to simplify the drawing.

In FIG. 15, the top frame 148 has been raised by loosening the mounting bolts to allow space for the plenum 86 to form. The inner sidewalls 195 of the top frame 148 form the side boundaries of the plenum 86. The perimeter portion 191 of the gasket vial holder 185 contacts the inner side walls 195 around the entire perimeter of the gasket vial holder 185, thus forming a gas-tight seal 197, and acting as a peripheral sealing device 199. The top frame 148 has a recess area 156 on all four inner sidewalls 195 into which the upper gasket 90 is captured. The downward travel of the top frame 148 and the captured upper gasket 90 is controlled by the travel of the mounting bolts (see FIG. 13) as they are screwed into the tapped holes 158 (FIG. 13) in the metal support 189. The volume of the plenum 86 is thus likewise adjusted. The gas-tight seal 197 is continuously maintained when the plenum 86 is adjusted through a continuous range of volumes.

The gas-tight seal 197 is composed of a number of elements which surround the plenum 86. There are numerous ways in which this seal can be formed, and many variations are possible in the number and use of the elements. In the present preferred embodiment, the gas-tight seal 197 can be thought of as all the elements which define the outer boundaries of the plenum 86. For purposes of this discussion, area of the plenum 86 will be assumed not to the volume of space inside the vials 28, so that the barrels of the vials 28 will not be considered as part of the gas-tight seal 197. The tube rims 37 may help to block gas flow through the holes 101 in the top vial holder 183, but the present invention, with some minor obvious modifications will work with vials 28 having either rims 37 or no rims, so the tube rims are considered an optional element to the gas-tight seal. The gasket vial holder 185 has holes 103 of smaller diameter so that the gasket material fits snuggly around the barrels 29 of the vials, and is therefore also optionally an element of the gas-tight seal 197. It is possible, for example, to use vials without rims, and to use stand-offs positioned between the base 114 and the metal support 189 to stop downward travel of the vials at the appropriate length. The matrix portion 192 of the gasket vial holder 185 thus forms the gas-tight seal 197 at that portion of the plenum 86.

Conversely, it is possible that the tube rims 37 of the vials 28 could be designed to form a gas-tight seal 197 when seated against the top surface of the top vial holder 183. There may optionally be O-rings at the junction of the tube rim 37 and the top vial holder holes. In either of these two cases, the holes 103 in the gasket vial holder 103 may be large enough so that the matrix 192 material does not form a gas-tight seal 197, since this function is fulfilled by the tube rims 37 and/or O-rings. Many variations are possible in the formation of the gas-tight seal, as long as the plenum is maintained, and adjustment of the plenum volume is permitted.

In FIG. 15, therefore, the gas-tight seal 197 will be seen to include the lower surface 196 of the upper gasket 90, which acts as the ceiling 190 of the gas-tight seal 197, the inner side-walls 195 of the top frame 148, and the perimeter portions 191 and matrix portions 192 of the gasket vial holder 187. The upper gasket 90 is used to allow penetration of a needle through the holes in the frame hole array 150, through the gasket 90 down into the mouths 32 of the vials 28 for introducing material into the vials 28. This feature, too, is optional, so that, for example a solid top frame piece with no holes could be used, and the gasket 90 dispensed with, so that the lower surface 198 of the top frame 148 forms the ceiling 190 of the gas-tight seal 197. It is also possible that a coating, perhaps of Teflon, or rubberized material on the lower surface 198 could take the place of the gasket and thus form the ceiling 190.

The portion of the apparatus including the upper 180 and lower frame assemblies 181 which are configured to hold vials and form an adjustable volume plenum 86 within will be referred to as the plenum enclosure 182. It is expected that many different sizes, numbers, and volumes of vials may be used, and that the dimensions of the plenum enclosure 182 may be varied to accommodate these variations. Although it is preferred that the vials be ordered in a standard 8×12 matrix, and that the overall device conform to the footprint of a standard 96 well plate, this is by no means a requirement, and many other variations in arrangement and number are contemplated by the present invention.

FIG. 16 shows a cross-sectional view of the multi-well array with adjustable plenum 110 in which the mounting bolts 160 (see FIG. 13) have been tightened until the upper gasket 90 has contacted the mouths 32 of the vials 28, sealing them. The plenum 86, at this point, can be considered to have minimum volume, which roughly corresponds to the "closed position" 49 referred to in the description of the earlier embodiment. It is to be understood that by "minimum volume", the plenum can be considered to be effectively zero as far as passage of gas from the outside source to the vials 28 is concerned. However, there is likely to remain some small pockets of gas around the vial rims 37 or barrels 29 and so the plenum 86 will be referred to as having minimum volume rather than zero volume. It It is possible that the plenum 86 be adjustable only to these two "open position" and "closed position" states, however it is preferred and an additional object of the invention that intermediate volumes can be established between the upper limit of plenum volume, and the minimum shown in FIG. 16. An intermediate volume can have advantages when purging gases are used, by minimizing the volume, while leaving adequate volume necessary for proper flow. It is especially useful when expensive or toxic gases are used, to minimize expense of the gas used, or to be disposed of.

In addition to the above mentioned examples, various other modifications and alterations of the inventive device 10 may be made without departing from the invention.

These modifications include alterations with regard to the types of materials used, their methods of attachment, and joining, and the shapes, dimensions and orientations of the components.

INDUSTRIAL APPLICABILITY

The multiwell apparatus with adjustable plenum 10, 110 of the present invention is designed to be used for many applications involving the testing and analysis of chemical compounds on a micro scale. The many advantages of doing work on a micro-scale include the reduced costs of reagents, solvents and materials due to the reduced amounts needed, and the generation of less waste materials which may be environmentally damaging and costly to dispose of.

Many chemical reactions are air sensitive and so may require an inert atmosphere, or a vacuum, for their performance. Reagents and substrates may be air sensitive (e.g., hygroscopic or pyrophoric) or corrosive. For such materials, the present invention 10, 110 allows the user to provide specific atmospheric conditions, or vacuum without having to transfer materials into a vacuum chamber or glove box in order to allow manipulations. This is done by manipulating the adjustment mechanism 168, in this case the mounting bolts 168, to raise the upper frame assembly 180 away from the lower frame assembly 181 to provide the desired volume in the plenum 86. The plenum 86 volume is enclosed by the inner side walls 195, lower surface of the upper gasket 196, and the gasket vial holder 183, of which the perimeter portion 191 forms a gas tight seal 197 around the edges where it contacts the inner side walls 195 and also around the barrels 29 of the vials 28. The mouths 32 of the vials or tubes 28 are thus open to the plenum 86. Gas can be introduced or vacuum drawn from one or both of the gas ports 56, 58. The adjustment mechanism 168 can then be manipulated to draw the upper frame assembly 180 down onto the bottom frame assembly 181 until the lower surface of the upper gasket 196 contacts the tube rims 37, sealing the tube mouths 32. The entire mechanism can then be agitated and completely inverted with danger of spillage.

The present invention 10, 110 is designed to fit in the carrier apparatus and heating oven described in pending application Ser. No. 08/972,996 filed by the same inventors.

After processing, the upper frame assembly 180 can be raised, restoring the plenum 86, and purging gas can be introduced or standard atmosphere restored, or another gas may be introduced for the next stage of processing.

By allowing an adjustable volume to be created for the plenum 86, the volume can be tailored for the specific operation at hand. For flushing or purging with inexpensive gases, a larger volume may be desired to provide proper circulation, whereas, when expensive or corrosive gases are required, a reduced volume may be desired.

The base 114, and the apparatus as a whole, preferably maintains a standard micro-plate footprint, which has many advantages in compatibility with other laboratory equipment, and in automated processing and other batch processing equipment. This standard footprint and well spacing allows materials to easily be simultaneously transferred to and from other apparatus with the same standard array layout. It is easily compatible with standard multi-channel pipettes and other liquids handling equipment.

For the above, and other reasons, it is expected that the multi-well apparatus with adjustable plenum 10, 110 will have widespread industrial applicability. Therefore, it is expected that the commercial utility of the present invention will be extensive and long lasting.

What is claimed is:

1. An apparatus for multiple simultaneous synthesis, comprising:
   a plurality of vials, each vial having an upper, a lower end, and a barrel, said upper end opening into a mouth portion;
   a lower frame assembly having a plurality of holes for receiving said plurality of vials,
   an upper frame assembly, including inner side-walls and a ceiling; and
   a gas-tight seal surrounding a plenum, said plenum being formed between said upper frame assembly ceiling and said lower frame assembly, and said plenum formed so as to be adjustable in volume by the positioning of said upper frame assembly in variable relation to said lower frame assembly, while maintaining said gas-tight seal is maintained.

2. The apparatus of claim 1, further comprising:
   an adjustment mechanism which controls the positioning of said upper frame assembly and said lower frame assembly, by which the volume of the plenum can be varied from an open position to a closed position.

3. The apparatus of claim 1, further comprising:
   an adjustment mechanism which controls the positioning of said upper frame assembly and said lower frame assembly, by which the volume of the plenum can be continuously varied through a range of volumes.

4. The apparatus of claim 3, wherein:
   said adjustment mechanism includes at least one mounting bolt.

5. The apparatus of claim 1, wherein:
   said volume of said plenum can be adjusted such that said ceiling seals said vials.

6. The apparatus of claim 5, wherein:
   said ceiling of upper frame assembly includes an upper gasket which contacts and seals said mouth portions of said vials when said volume of said plenum is minimized.

7. The apparatus of claim 6, wherein:
   said upper frame assembly includes a frame hole array, said holes of which are aligned with said mouth portions of said vials, so that a needle can be introduced through one of said holes, and then through said upper gasket into said mouth of said vial, thus allowing introduction of new material into said vial.

8. The apparatus of claim 5, wherein:
   said upper frame assembly includes a top frame having a lower surface which acts as said ceiling, and which contacts and seals said mouth portions of said vials when said volume of said plenum is minimized.

9. The apparatus of claim 1, wherein:
   said lower frame assembly includes a gasket vial holder including a perimeter portion which engages said inner side-walls of said upper frame assembly, such that said perimeter portion acts as a portion of said gas-tight seal.

10. The apparatus of claim 9, wherein:
    said lower frame assembly includes a top vial holder and a bottom vial holder; and
    said gasket vial holder is sandwiched between said top vial holder and said bottom vial holder, said gasket vial holder being of larger extent than said top and bottom vial holders so that said perimeter portion of said gasket vial holder protrudes to engage said inner side-walls and act as a portion of said gas-tight seal.

11. The apparatus of claim 1, wherein:
said lower frame assembly includes a gasket vial holder including a matrix portion surrounding a plurality of holes through which the barrels of said vials extend, said matrix portion being configured to engage said barrels of said plurality of vials, such that said matrix portion acts as a portion of said gas-tight seal.

12. The apparatus of claim 1, wherein:
said lower frame assembly includes an O-ring which engages said inner side-walls and acts as a portion of said gas-tight seal.

13. The apparatus of claim 1, wherein: said lower frame assembly includes a metal support.

14. The apparatus of claim 1, further comprising:
at least one guide rod.

15. The apparatus of claim 1, further comprising:
a base having a plurality of holes configured to receive said lower ends of said vials.

16. The apparatus of claim 15, wherein:
said upper frame assembly and said base have a dimensional footprint which corresponds to that of a standard microplate.

17. The apparatus of claim 1, wherein:
each of said plurality of said vials has a tube rim of larger diameter than said vial barrel, which blocks gas flow around the barrel of said vial and thus acts as a portion of said gas-tight seal.

18. The apparatus of claim 1, wherein:
said vials are arrayed in a standard 96-well format.

19. The apparatus of claim 1, wherein:
said vials are independently removable.

20. The apparatus of claim 1, wherein:
said vials are integrally formed into a unitary block.

21. A plenum enclosure for multiple simultaneous synthesis used in conjunction with vials, comprising:
a lower frame assembly having a plurality of holes for receiving said vials;
an upper frame assembly, including inner side-walls and a ceiling; and
a gas-tight seal surrounding a plenum, said plenum being formed between said upper frame assembly ceiling, and said lower frame assembly, and said plenum formed so as to be adjustable in volume by the positioning of said upper frame assembly in variable relation to said lower frame assembly, while said gas-tight seal is maintained.

22. The plenum enclosure of claim 21, further comprising:
an adjustment mechanism which controls the positioning of said upper frame assembly and said lower frame assembly, by which the volume of the plenum can be varied from an open position to a closed position.

23. The plenum enclosure of claim 21, further comprising:
an adjustment mechanism which controls the positioning of said upper frame assembly and said lower frame assembly, by which the volume of the plenum can be continuously varied through a range of volumes.

24. The plenum enclosure of claim 21, wherein: said volume of said plenum can be adjusted such that said ceiling seals said vials.

25. The plenum enclosure of claim 24, wherein:
said upper frame assembly includes an upper gasket which acts as said ceiling for said gas-tight seal, and which contacts and seals said vials when said volume of said plenum is minimized.

26. The plenum enclosure of claim 24, wherein:
said upper frame assembly includes a frame hole array, said holes of which are aligned with said mouths of said vials, so that a needle can be introduced through one of the holes, and then through said upper gasket into the mouth of said vial, thus allowing introduction of material into said vial.

27. The plenum enclosure of claim 24, wherein:
said upper frame assembly includes a top frame having a lower surface which acts as said ceiling for said gas-tight seal, and which contacts and seals said mouths of said vials when said volume of said plenum is minimized.

28. The plenum enclosure of claim 21, wherein:
said lower frame assembly includes a gasket vial holder including a perimeter portion which engages said inner side-walls of said upper frame assembly, such that said perimeter portion acts as a portion of said gas-tight seal.

29. The plenum enclosure of claim 28, wherein:
said lower frame assembly includes a top vial holder and a bottom vial holder; and
said gasket vial holder is sandwiched between said top vial holder and said bottom vial holder, said gasket vial holder being of larger extent than said top and bottom vial holders so that a perimeter portion of said gasket vial holder protrudes to engage said inner side-walls and act as a portion of said gas-tight seal.

30. The plenum enclosure of claim 21, wherein:
said lower frame assembly includes an O-ring which engages said inner side-walls and acts as a portion of said gas-tight seal.

31. The plenum enclosure of claim 21 wherein:
said holes for receiving vials are arrayed in a standard 96-well format.

32. The plenum enclosure of claim 21, further comprising:
a base having a plurality of holes configured to receive said lower ends of said vials.

33. The plenum enclosure of claim 32, wherein:
said upper frame assembly and said base have a dimensional footprint which corresponds to that of a standard microplate.

34. A gasket vial holder for use in a plenum enclosure which includes a top frame assembly having inner side walls and a bottom frame assembly, said gasket vial holder configured to hold an array of vials each having a barrel portion, said gasket vial holder comprising:
a matrix portion surrounding an array of holes, said matrix portion being of flexible material such that when vials are inserted in said array of holes, said matrix contacts the barrels of the vials and fits snuggly with the barrels to form a gas-tight seal at points of contact with said vials; and
a perimeter portion of sufficient extent that it forms a gas-tight seal with said inner sides of said top frame assembly.

35. A gasket vial holder as in claim 34, wherein:
said matrix portion is made of elastomeric material.

36. A gasket vial holder as in claim 34, wherein:
said gasket vial holder is attached to at least one rigid plate.

37. A gasket vial holder as in claim 34, wherein:
said gasket vial holder is sandwiched between two rigid plates.

* * * * *